United States Patent [19]
Park

[11] Patent Number: 5,627,657
[45] Date of Patent: May 6, 1997

[54] METHOD FOR SEQUENTIALLY DISPLAYING INFORMATION RECORDED ON INTERACTIVE INFORMATION RECORDING MEDIUM

[75] Inventor: Chan-Sou Park, Cheonan-Shi, Rep. of Korea

[73] Assignee: Daewoo Electronics Co., Ltd., Seoul, Rep. of Korea

[21] Appl. No.: 613,763

[22] Filed: Feb. 28, 1996

[30] Foreign Application Priority Data

Feb. 28, 1995 [KR] Rep. of Korea ............ 95-3990
Feb. 28, 1995 [KR] Rep. of Korea ............ 95-3991

[51] Int. Cl.$^6$ .................................................. H04N 5/781
[52] U.S. Cl. .................................. 386/70; 360/69; 369/32; 386/126; 386/15
[58] Field of Search ...................... 358/342; 348/7, 348/13; 369/48, 49, 50, 51, 52, 53, 54, 32; 360/69; 84/609

[56] References Cited

U.S. PATENT DOCUMENTS

| | | | |
|---|---|---|---|
| 5,175,720 | 12/1992 | Clark | 369/94 |
| 5,208,679 | 5/1993 | Yamauchi et al. | 358/342 |
| 5,243,582 | 9/1993 | Yamauchi et al. | 369/32 |
| 5,294,745 | 3/1994 | Yamauchi et al. | 84/601 |
| 5,325,423 | 6/1994 | Lewis | 379/90 |
| 5,336,844 | 8/1994 | Yamauchi et al. | 84/602 |
| 5,410,100 | 4/1995 | Kim | 84/645 |
| 5,437,464 | 8/1995 | Terasima et al. | 273/434 |
| 5,446,714 | 8/1995 | Yoshio et al. | 369/48 |
| 5,464,946 | 11/1995 | Lewis | 84/609 |
| 5,546,368 | 8/1996 | Lee et al. | 369/47 |

*Primary Examiner*—Thai Q. Tran
*Assistant Examiner*—Vincent F. Boccio
*Attorney, Agent, or Firm*—Foley & Lardner

[57] ABSTRACT

A method for sequentially and automatically displaying, for the predetermined or whole time, picture play items and segment information defined with respect to the picture play items on an interactive information recording media on which aural information and image information are recorded including characters, graphics, music etc. In order to confirm all information recorded on an interactive information recording medium according to a user, a sequence information play mode is selected and the playback time is set. Then, the playback operation of the lists on which information are recorded according to the sequence information play mode is carried out for the set playback time. When a following play mode is, the playback for the following play mode may be performed, as stated above. All the items recorded on an interactive information recording medium are sequentially and automatically displayed for a total time or a partial time so that a user can confirm all the items.

7 Claims, 19 Drawing Sheets

| | | |
|---|---|---|
| $0000 | RESERVED($0000) | |
| LISTID 1 | $0000 | → SELECTION LIST 1 |
| LISTID 2 | $0004 | → SELECTION LIST 2 ($4×8=$20) |
| LISTID 3 | $0008 | → PLAY LIST 1 ($8×8=$40) |
| LISTID 4 | $000B | → PLAY LIST 2 ($B×8=$58) |
| LISTID 5 | $000D | → PLAY LIST 3 ($D×8=$68) |
| LISTID 6 | $0010 | → PLAY LIST 4 ($10×8=$80) |
| LISTID 7 | $0013 | → PLAY LIST 5 ($13×8=$98) |
| UNUSED | $FFFF | |
| | $FFFF | |
| | ⋮ | |
| | $FFFF | |
| $7FFF | $FFFF | |

FIG.6

| Address | Content | Size |
|---|---|---|
| 00:04:34  $0000 | SELECTION LIST 1 | 26BYTES |
| $001A | PADDING ($00×6) | |
| $0020 | SELECTION LIST 2 | 26BYTES |
| $003A | PADDING ($00×6) | |
| $0040 | PLAY LIST 1 | 18BYTES |
| $0052 | PADDING ($00×6) | |
| $0058 | PLAY LIST 2 | 16BYTES |
| $0068 | PLAY LIST 3 | 18BYTES |
| $007A | PADDING ($00×6) | |
| $0080 | PLAY LIST 4 | 18BYTES |
| $0092 | PADDING ($00×6) | |
| $0098 | PLAY LIST 5 | 18BYTES |
| $00AA | | |

TOTAL 170BYTES

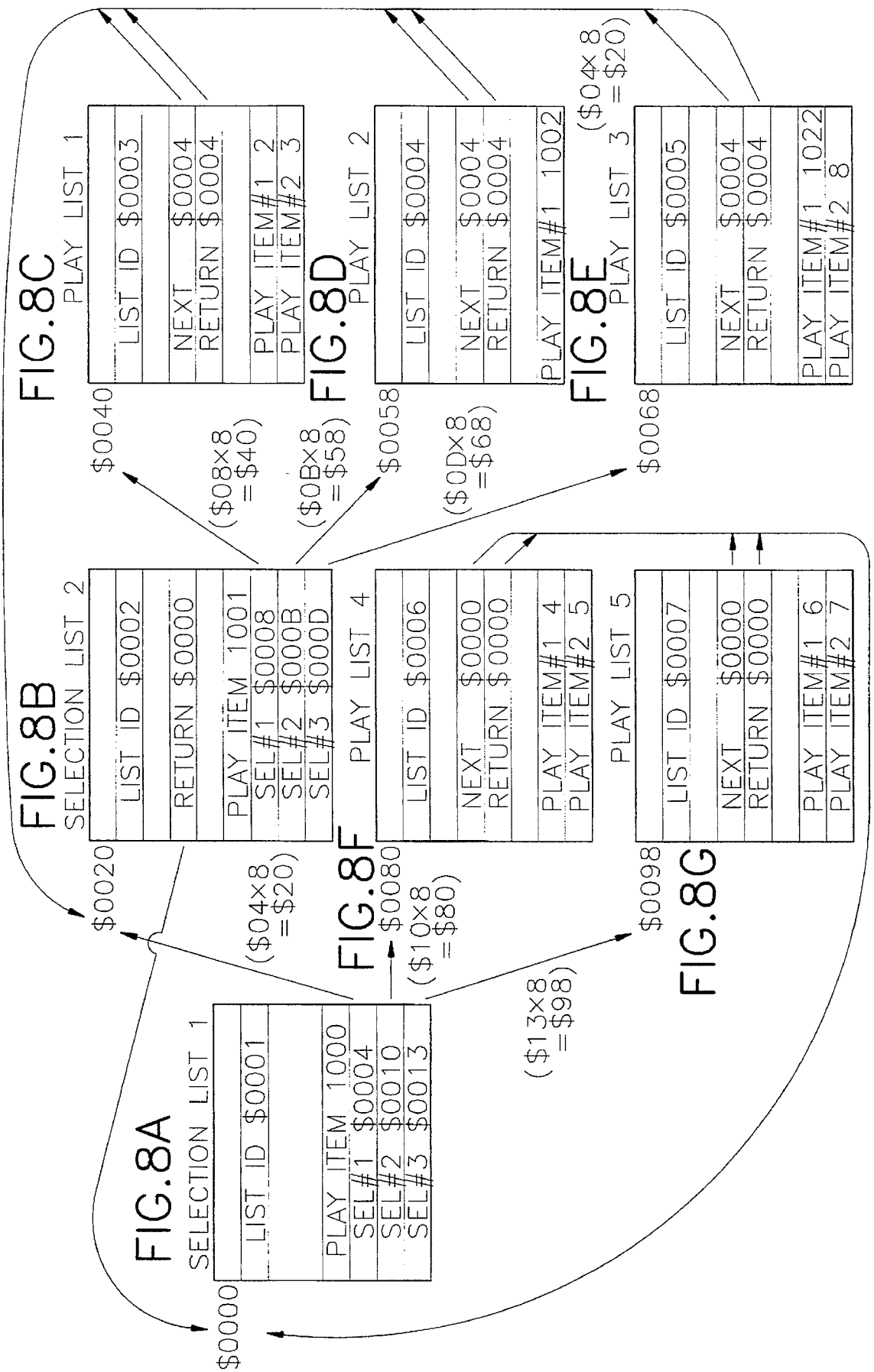

PLAY ITEM #1000
(*SEGMENT PLAY ITEM #1)

ENGLISH LESSON
1. EXPERT COURSE
2. MIDDLE COURSE
3. BEGINNER COURSE

MENU1
STILL
PICTURE

PLAY ITEM #1001
(*SEGMENT PLAY ITEM #2)

EXPERT COURSE
1. LESSON 1
2. LESSON 2
3. LESSON 3

MENU1
STILL
PICTURE

PLAY ITEM #1002
(=SEGMENT PLAY ITEM #3)

EXPERT COURSE
LESSON2
SLIDESHOW

PLAY ITEM #1022
(=SEGMENT PLAY ITEM #23)

FAMOUS
GOLF PLAYER'S
ADVICES

STILL
PICTURE

PLAY ITEM #1
(=MEPG AV TRACK #2)
TRACK2

EXPERT COURSE
LESSON1
MOTION PICTURE1

PLAY ITEM #2
(=MEPG AV TRACK #3)
TRACK3

EXPERT COURSE
LESSON1
MOTION PICTURE1

PLAY ITEM #4
(=MEPG AV TRACK #4)
TRACK4

MIDDLE COURSE
MOTION PICTURE1

PLAY ITEM #5
(=MEPG AV TRACK #5)
TRACK5

MIDDLE COURSE
MOTION PICTURE2

FIG.9I
PLAY ITEM #6
(=MEPG AV TRACK #6)
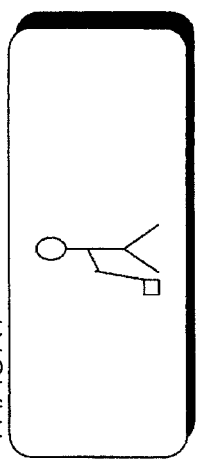
TRACK6
BEGINNER COURSE
MOTION PICTURE1
FIG.9J
PLAY ITEM #7
(=MEPG AV TRACK #7)
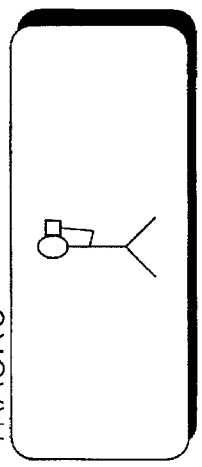
TRACK7
BEGINNER COURSE
MOTION PICTURE2
FIG.9K
PLAY ITEM #8
(=CD-DA TRACK #8)
CD DIGITAL AUDIO
EXPERT COURSE
LESSON3 (CD-DA)

METHOD FOR SEQUENTIALLY DISPLAYING INFORMATION RECORDED ON INTERACTIVE INFORMATION RECORDING MEDIUM

BACKGROUND OF THE INVENTION

1. Field of the Invention

The present invention relates to a method for sequentially displaying information recorded on an interactive information recording medium, and more particularly, to a method for sequentially and automatically displaying, for the pre-determined or whole time, picture play items and segment information defined with respect to the picture play items on an interactive information recording media on which aural information and image information are recorded including characters, graphics, musics etc.

2. Description of the Prior Art

In the area of optical discs, compact discs are widely used as information recording media in which a large quantity of audio information is recorded. In information recording media in the form of a disc, an audio compact disc (hereinafter referred to as "CD") has been developed firstly. A compact disc graphics (hereinafter referred to as "CDG") on which graphic information and audio information are recorded has been developed, and a video CD on which motion image information and audio information are recorded is nowadays common used to break the image monotony which is caused by the CDG wherein the still images are recorded.

The video CD is an optical disc where the aural/motion information are so compressed in suitable information content by a moving picture experts group (MPEG) algorithm and recorded thereon in large quantity and reproduced by the MPEG algorithm that a large amount of aural/motion information are recorded/reproduced. The video CD is an information recording medium which can be used for aural/motion information recording/reproducing which requires a large quantity of recording area.

In addition, there has been proposed an interactive information recording medium such as the so-called CD-interactive (CD-I) by which the user can perform the reproducing operation with respect to the characters, graphics, music etc. recorded thereon by an interactive manner. Further, an interactive video CD (video CD V2.0) has been proposed by which the user can selectively reproduce a specific information of the interactive information recording medium in an interactive manner on the basis of the MPEG algorithm which is applied to the recording/reproducing of the video CD.

The interactive information recording medium includes a main directory, and at least one sub-directory derived from the main directory for indicating the whole menu of contents which are recorded on the corresponding information recording medium. Each of the sub-directories has picture play items for outputting on a display and at least one segment item which is defined in the picture play items. Thus, when the user sequentially designates from the main directory to the sub-directory related to at least one segment item, the display related thereto is shown so that the user may obtain from the interactive information recording medium. U.S. Pat. No. 5,359,472 describes an embodiment of a method and an apparatus for sequentially displaying information recorded on an interactive information medium as above.

However, since the interactive information recording medium is composed of at least one directory and segment item, when the user intends to reproduce the necessary information in the directory and in the sub-directory related to the segment items, the user has to select a button of a key input section a plurality of times between the directory and picture play items or the segment items. Further, it is inconvenient to confirm all the items which are recorded on the interactive information recording medium.

SUMMARY OF THE INVENTION

Therefore, an object of the present invention is to provide a method for sequentially and automatically displaying all the items recorded on an interactive information recording medium for a total time or a partial time so that the user can confirm all the items.

In order to achieve the above-mentioned object of the present invention, there is provided a method for sequentially displaying information of an interactive information recording medium. The method comprises the steps of:

i) reading disc information data which are recorded on a video compact disc;

ii) reading user's controlling files to store the user's controlling files in a storing means when the video compact disc is the interactive information recording medium, the user's controlling files including a play sequence descriptor file;

iii) initializing an offset of the play sequence descriptor file when a sequence information play mode is selected by a user;

iv) setting a play time according to a selection of playback modes, and setting a waiting time to be "0";

v) multiplying the initialized offset in the step iii) by a first number, to obtain a mutilplied value;

vi) reading an offset header from the play sequence descriptor files;

vii) reading out a play item number which is defined in a selection list, when the current list of the video compact disc is the selection list not a play list;

viii) initializing a selection item number of a counter, and setting a counting time of the counter to a first time;

ix) reproducing a selection item which is defined in the selection list;

x) judging whether or not the selection item number is larger than a total selection item number recorded in the selection list;

xi) increasing the selection item number by a second number when the selection item number is not larger than the total selection item number;

xii) reading an offset of the increased selection item number in the selection list as an offset of a first selection item selected;

xiii) judging whether or not the offset of a first selection item is a reproduced offset, if a most significant bit of the offset of a first selection item is a third number in a binary number so that the offset of the first selection item is judged as the reproduced offset, returning to the step x), and if the most significant bit of the offset of a first selection item is a fourth number in a binary number so that the offset of the first selection item is judged as the non-reproduced offset, logically OR-combining the offset of the first selection item and a fifth number to obtain a reproduced offset;

xiv) logically AND-combining the reproduced offset and a sixth number to return the original offset of the first selection item, and returning to the step v);

xv) reading out a play item number which is defined in the play list, when the current list of the video compact disc is the play list;

xvi) initializing a play item number of the counter, and setting a counting time of the counter to be the first time;

xvii) reproducing a play item which is defined in the play list;

xviii) increasing the counted play item number by a seventh number;

xix) judging whether or not the increased play item number is larger than a total play item number recorded in the play list; and xx) when the increased play item number is not larger than the total play item number recorded in the play list, returning to the step xv), and when the increased play item number is larger than the total play item number recorded in the play list, judging whether or not a next offset is in the play list.

Further, the above-mentioned object of the present invention may be achived providing by a method for sequentially displaying information of an interactive information recording medium. The method comprises the steps of:

a) reading disc information data which are recorded on a video compact disc where an information recording medium loaded on an information reproducing system is the video compact disc, to store the read disc information data in a storing means;

b) judging whether or not the video compact disc is an interactive information recording medium by reading a specification version number from the stored disc information data in the storing means, if the video compact disc is not the interactive information recording medium, performing a general reproducing operation for the video compact disc, and if the video compact disc is the interactive information recording medium, to read "ENTRIES.VCD" files, "list identification offset table.VCD" files, and "play sequence descriptor.VCD" files from the video compact disc, and storing the read "ENTRIES.VCD" files, the read "list identification offset table.VCD" files, and the read "play sequence descriptor.VCD" files in the storing means;

c) judging whether or not a sequence information play mode is selected by a user, if the sequence information play mode is not selected by the user, performing a general reproducing operation for the interactive video compact disc in an interactive manner by a selection of the user, and if the sequence information play mode is selected by the user, initializing an offset of the "play sequence descriptor.VCD" files stored in the storing means as $0000;

d) judging whether a total playback or a partial playback in the sequence information play mode is selected by the user, setting a play time according to the selection of the playback, and setting a waiting time to be "0";

e) multiplying the initialized offset $0000 in the step c) by 8, to get $0000;

f) reading an offset header from the "play sequence descriptor.VCD" files stored in the storing means, and judging whether a current list is a selection list or a play list;

g) reading out a play item number which is defined in the selection list, if the current list is the selection list according to the result of the judgment in the step f), initializing a selection item number of a counter to be "0", and setting a counting time of the counter to be 5 seconds;

h) reproducing a play item which is defined in the selection list;

i) judging whether or not the reproducing operation for the play item which is defined in the selection list is completed, if the reproducing operation for the play item is completed, judging whether or not the counted selection item number "0" by a counter in the step g) is larger than a selection item number recorded in the selection list;

j) according to the result of judgement of whether or not the counted selection item number "0" by a counter in the step g) is larger than a selection item number recorded in the selection list in the step i), if the counted selection item number is larger than the selection item number in the step i), judging whether or not a next offset is in the selection list, and if the counted selection item number is not larger than the selection item number in the step i), adding 1 to the counted selection item number and then reading an offset of selection number in the selection list as an offset of a first selection item selected according to adding 1 to the counted selection item number;

k) judging whether or not the offset of a first selection item is a reproduced offset, if a most significant bit of the offset of a first selection item is "1" in a binary number so that the offset of the first selection item is judged as the reproduced offset, returning to the step i), and if the most significant bit of the offset of a first selection item is "0" in a binary number so that the offset of the first selection item is judged as the non-reproduced offset, logically OR-combining the offset of the first selection item and &8000 and get a reproduced offset a most significant bit of which is "1";

l) logically AND-combining the reproduced offset a most significant bit of which is "1" and &7FFF to return the original offset of the first selection item, and returning to the step e) to repeat the operation after the step e);

m) reading out a play item number which is defined in the play list, if the current list is the play list according to the result of the judgment in the step f), initializing a play item number of the counter to be "1", and setting a counting time of the counter to be 5 seconds;

n) reproducing a play item which is defined in the play list;

o) judging whether or not the reproducing operation for the play item which is defined in the play list is completed, if the reproducing operation for the play item is completed, adding 1 to the counted play item number "1" by the counter in the step m) to increase "2";

p) judging whether or not the increased play item number "2" in the step o) is larger than a total play item number recorded in the play list; and q) according to the result of judgement of whether or not the increased play item number "2" in the step o) is larger than a total play item number recorded in the play list, if the increased play item number "2" is not larger than the total play item number recorded in the play list, returning to the step m), and if the increased play item number "2" is larger than the total play item number recorded in the play list, judging whether or not a next offset is in the play list.

Preferably, according to the result of the judgment in the step d), the total playback in the sequence information play mode is selected by the user, the play item is reproduced for the total time, and if a partial playback is selected, the play item is reproduced only for the set time by the user.

Preferably, the method further comprises the steps of:

i-1) if the reproducing operation for the play item is not completed according to the result of the judgement in the step i), judging whether or not the play item is selected as a total playback mode, if the play item is selected as a total playback mode, returning to the step h), and if the play item is not selected as a total playback mode, judging whether or not the counting time in the step g) is larger than 5 seconds; and i-2) according to the result of the judgement in the step i-1), if the counting time in the step g) is not larger than 5 seconds, returning to the step h), and if the counting time in the step g) is larger than 5 seconds, going to the step i) of judging whether or not the counted selection item number "0" by a counter in the step g) is larger than a selection item number recorded in the selection list.

Preferably, if the counted selection item number is larger than the selection item number in the step i) according to the result of judgement of whether or not the counted selection item number is larger than the selection item number recorded in the selection list in the step i), after judging whether or not the next offset is in the selection list, said method further comprising the steps of:

j-a) according to the result of judgement of whether or not the next offset is in the selection list, if the next offset is in the selection list, setting the next offset as a current offset to return to the step e), and if the next offset is not in the selection list, judging whether or not the previous offset is in the selection list;

j-b) according to the result of judgement of whether or not the previous offset is in the selection list in the step j-a), if the previous offset is in the selection list, setting the previous offset as a current offset to return to the step e), and if the previous offset is not in the selection list, judging whether or not the return offset is in the selection list; and j-c) according to the result of judgement of whether or not the return offset is in the selection list in the step j-b), if the return offset is in the selection list, setting the return offset as a current offset to return to the step e), and if the return offset is not in the selection list, finishing a total routine.

Preferably, after the step of judging whether or not the next offset is in the play list, said method further comprising the step of:

q-a) according to the result of judgement of whether or not the next offset is in the play list, if the next offset is in the play list, setting the next offset as a current offset to return to the step e), and if the next offset is not in the play list, judging whether or not the previous offset is in the play list;

q-b) according to the result of judgement of whether or not the previous offset is in the play list in the step q-a), if the previous offset is in the play list, setting the previous offset as a current offset to return to the step e), and if the previous offset is not in the play list, judging whether or not the return offset is in the play list; and q-c) according to the result of judgement of whether or not the return offset is in the play list in the step q-b), if the return offset is in the play list, setting the return offset as a current offset to return to the step e), but if the return offset is not in the play list, finishing a total routine.

In order to confirm all information recorded on an interactive information recording medium according to a user, a sequence information play mode is selected and the playback time is set. Then, the playback operation of the lists on which information are recorded according to the sequence information play mode is carried out for the set playback time. When a following play mode is, the playback for the following play mode may be performed, as stated above.

BRIEF DESCRIPTION OF THE DRAWINGS

The above objects and advantages of the present invention will become more apparent by describing in detail a preferred embodiment thereof with reference to the attached drawings in which:

FIG. 5 is a schematic diagram for showing an "LOT.VCD" layout in the directory "VCD" as shown in FIG. 3;

FIG. 6 is a schematic diagram for showing a "PSD.VCD" layout in the directory "VCD" directory as shown in FIG. 3;

FIGS. 8A to 8G are schematic diagrams for showing examples of the selection list and the display list as shown in FIGS. 5 and 6;

FIGS. 9A to 9K are schematic diagrams for showing the processing and display sequence of the picture play items and the segment play items in the directory "SEGMENT" as shown in FIG. 7 according to the selection list and the display list as shown in FIGS. 8A to 8G;

DESCRIPTION OF THE PREFERRED EMBODIMENT

A description will be given below in detail, with reference to the accompanying drawings, of the mechanical structure, the circuitry configuration, and the operation of an apparatus and a method for sequentially displaying the interactive information of the recording medium according to an embodiment of the present invention.

Figure 1:
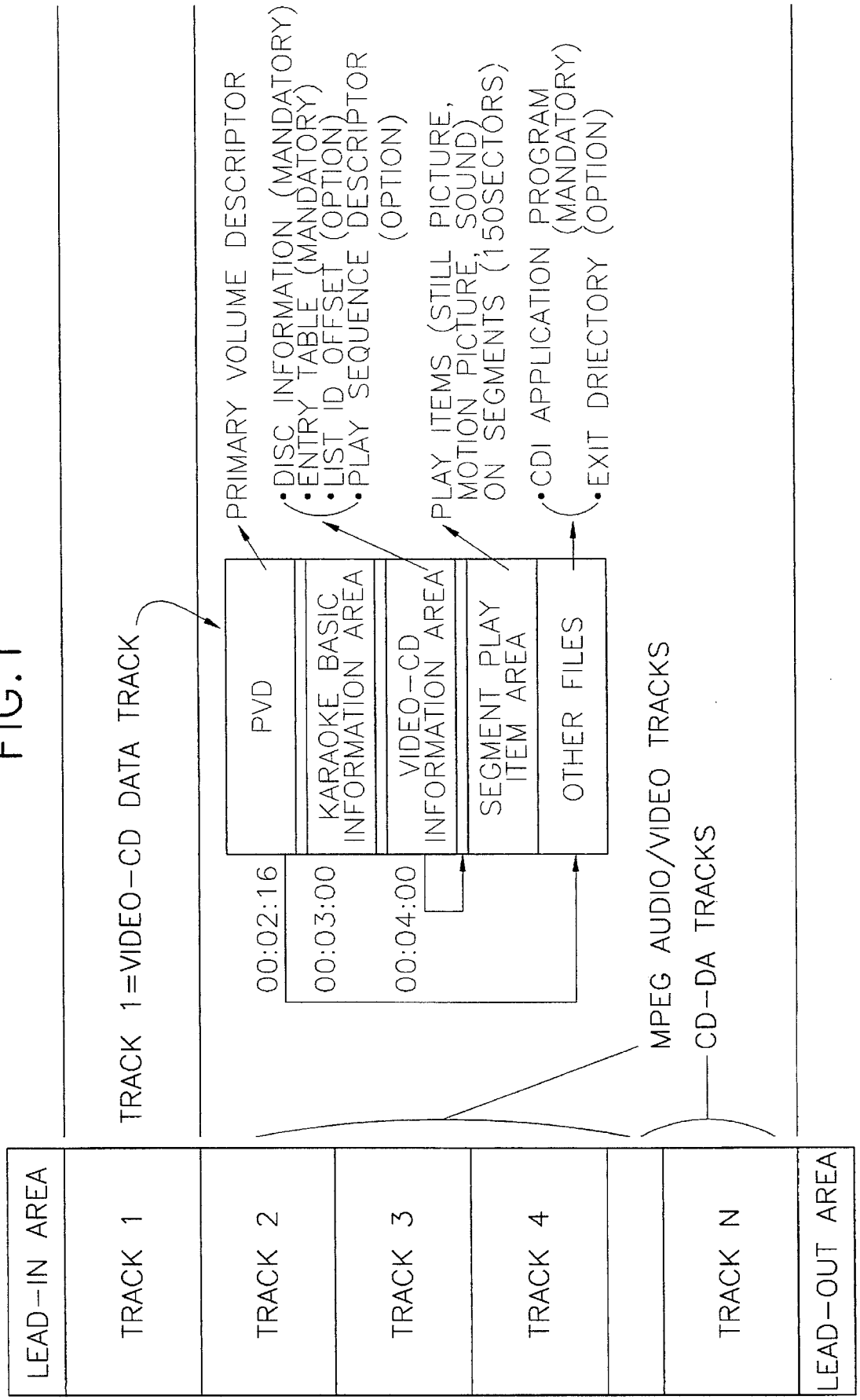
FIG. 1 is a schematic diagram for explaining an example of a video CD layout as an interactive information recording medium which can be used in the present invention.

FIG. 1 is a schematic diagram for explaining an example of a video CD layout as an information recording medium which can be used in the present invention. With reference to FIG. 1, generally, a video CD includes a lead-in area having table-of-contents (hereinafter referred to as "TOC") data of a corresponding disc, a program area wherein at least one track on which MPEG audio/video data are recorded in an MPEG manner is allotted and at least one different track such as a compact disc-digital audio (CD-DA) track may be allotted, and a lead-out area indicating the final information recording area of the corresponding disc. The program area has a plurality of tracks. A first track of the program is a video CD data track which has a primary volume descriptor (PAD) located at sector "00: 02: 16", a karaoke basic information area located at the sector "00: 03: 00", and a video CD information area located at sector "00: 04: 00". Tracks 2 to N-1 are allotted as the MPEG audio/video tracks. Track N is selectively allotted as a CD-DA track.

Figure 2:
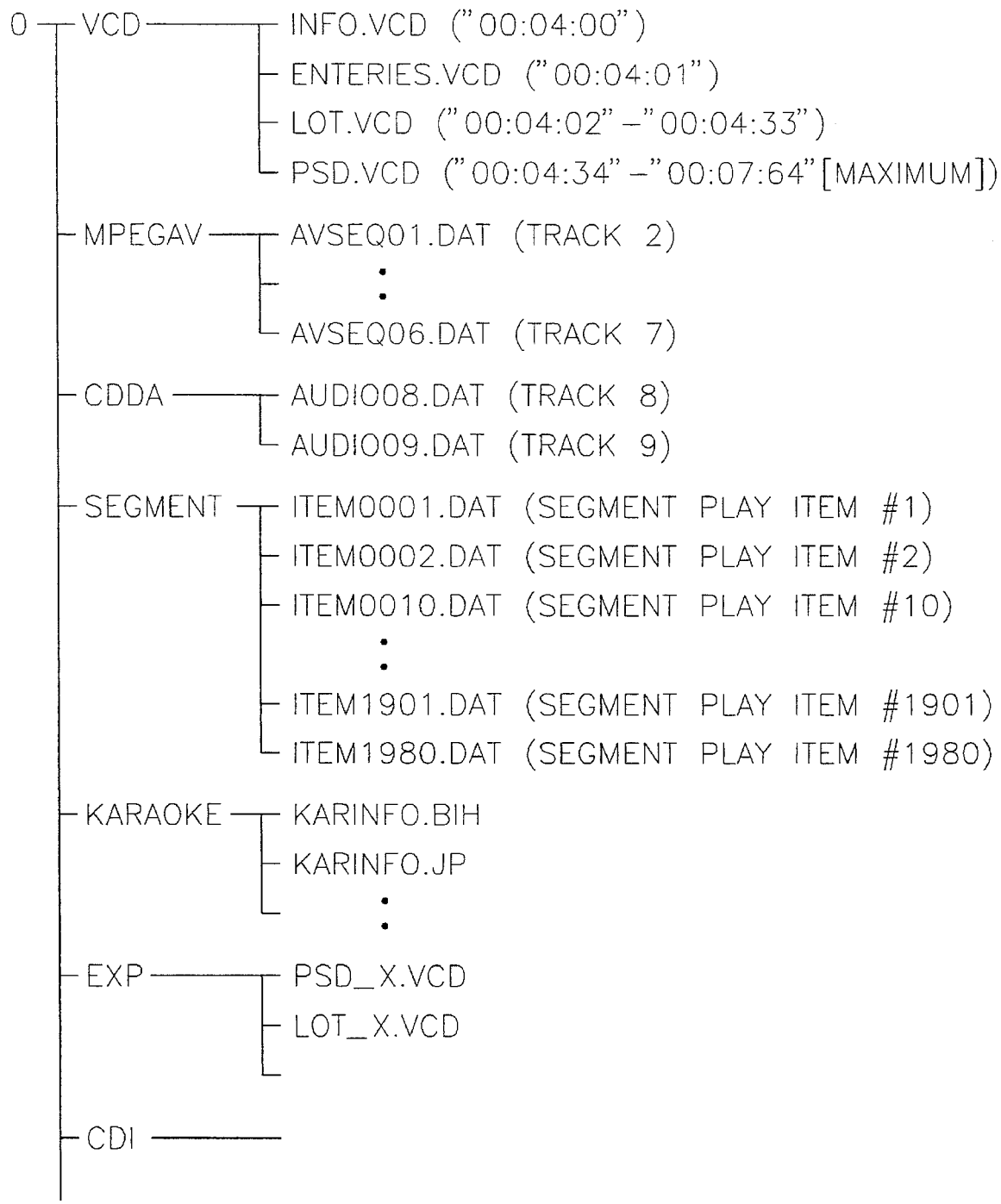
FIG. 2 is a view for illustrating an example of a directory structure of the video CD as shown in FIG. 1.

FIG. 2 is a view for illustrating an example of a directory structure of the video CD shown in FIG. 1. With reference to FIG. 2, a general directory of video CD includes a root directory (0) of a disc, a "VCD" directory having files in video CD information area, an "MPEGAV" directory having all the files indicating MPEG audio/video tracks, a "CDDA" directory having all the files indicating a CD-DA track, and a "SEGMENT" directory having the files in a segment display area when the segment display area is set in the information recording medium. Further, the video CD directory has a "KARAOKE" directory having the files in a karaoke basic information area when the karaoke basic information area is set in the information recording medium, an "EXT" directory having an extended play sequence descriptor (PSD), and a "CD-I" directory having CD-I files such as a CD-I application program. The general directories which are necessary for a video CD as an information recording medium, includes the root directory, the "CD-I" directory, the "VCD" directory, and the "MPEGAV" directory. The "VCD" directory a disc information area (INFO.VCD) defined in a "00 minute: 04 second: 16 frame" position, a recorded table area (ENTRIES.VCD) in a "00: 04: 01" position, a list identification (ID) offset area (LOT.VCD) defined in a "00: 04: 02–00: 04: 33" position, and a screen play sequence explainer area (PSD.VCD) in a "00: 04: 34–00: 07: 04" position (which may be allotted in 256 sectors at maximum).

Figure 3:
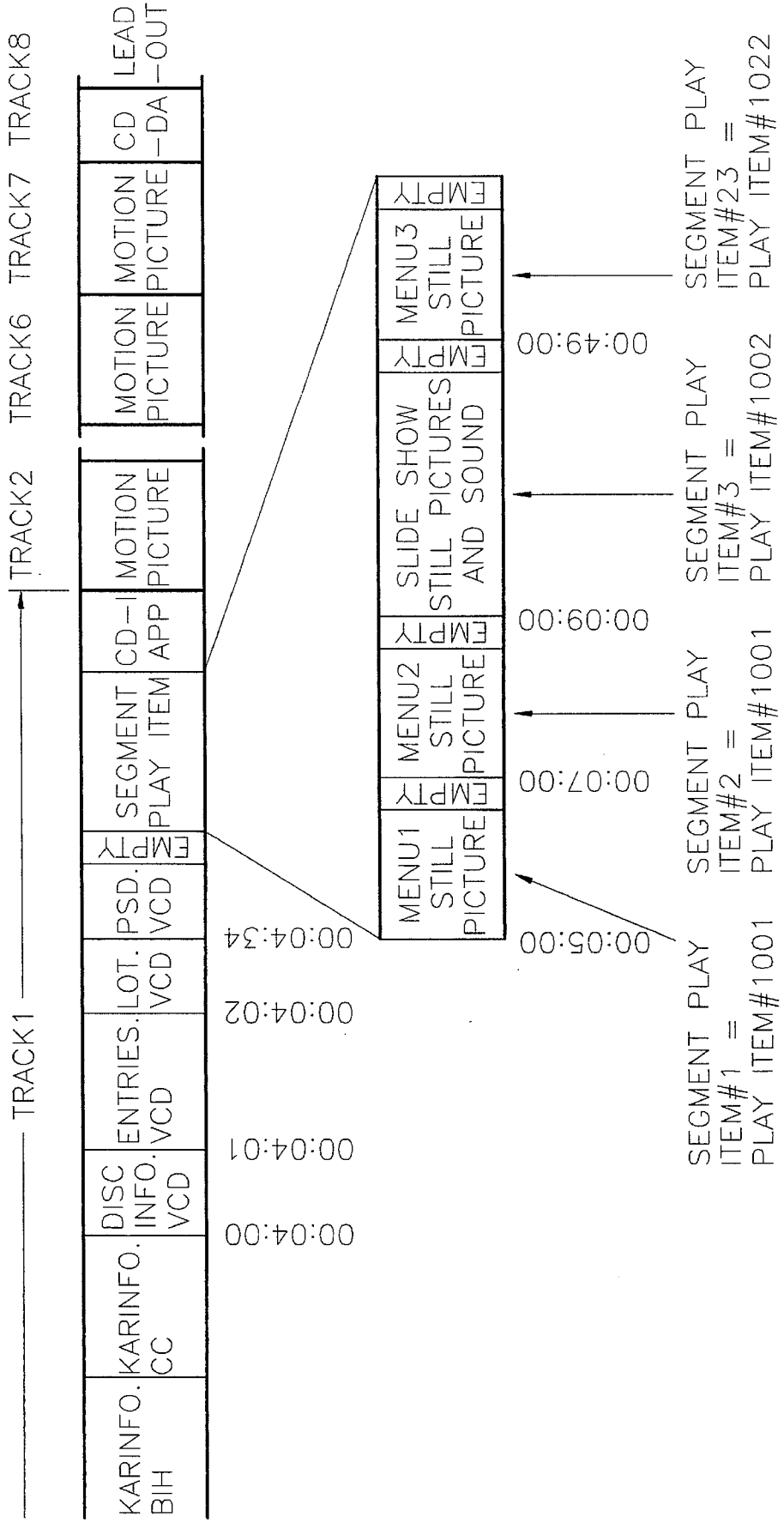
FIG. 3 is a schematic diagram for showing the track/directory structure of the video CD as shown in FIGS. 1 and 2 in a physical position based an absolute time.

FIG. 3 is a schematic diagram for showing the track/directory structure of the video CD shown in FIGS. 1 and 2 in a physical position based on absolute time. With reference to FIG. 3, in the track/directory of a video CD, a KARINFO.basic information header (BIH) and a KARINFO.country code (CC) are provided at the head. A "VCD" directory such as an INFO.VCD, an ENTRIES.VCD, a LOT.VCD and a PSD.VCD, is subsequently allotted. Further, data information corresponding to segment play items in a "SEGMENT" directory (see FIGS. 1 and 2), that is, a segment play item #1 (play item #1000: menu 1) of sector "00: 05: 00", a segment play item #2 (play item #1001: menu 2) of sector "00: 07: 00", a segment play item #3 (play item #1002: menu 3) of sector "00: 09: 00", and a segment play item #23 (play item #1022: menu 23) of sector "00: 05: 00" position, which follow after the "VCD" director. Sequentially, tracks 2 to N (e.g. track 8 in FIG. 3) having motion image information are provided.

Figure 4:
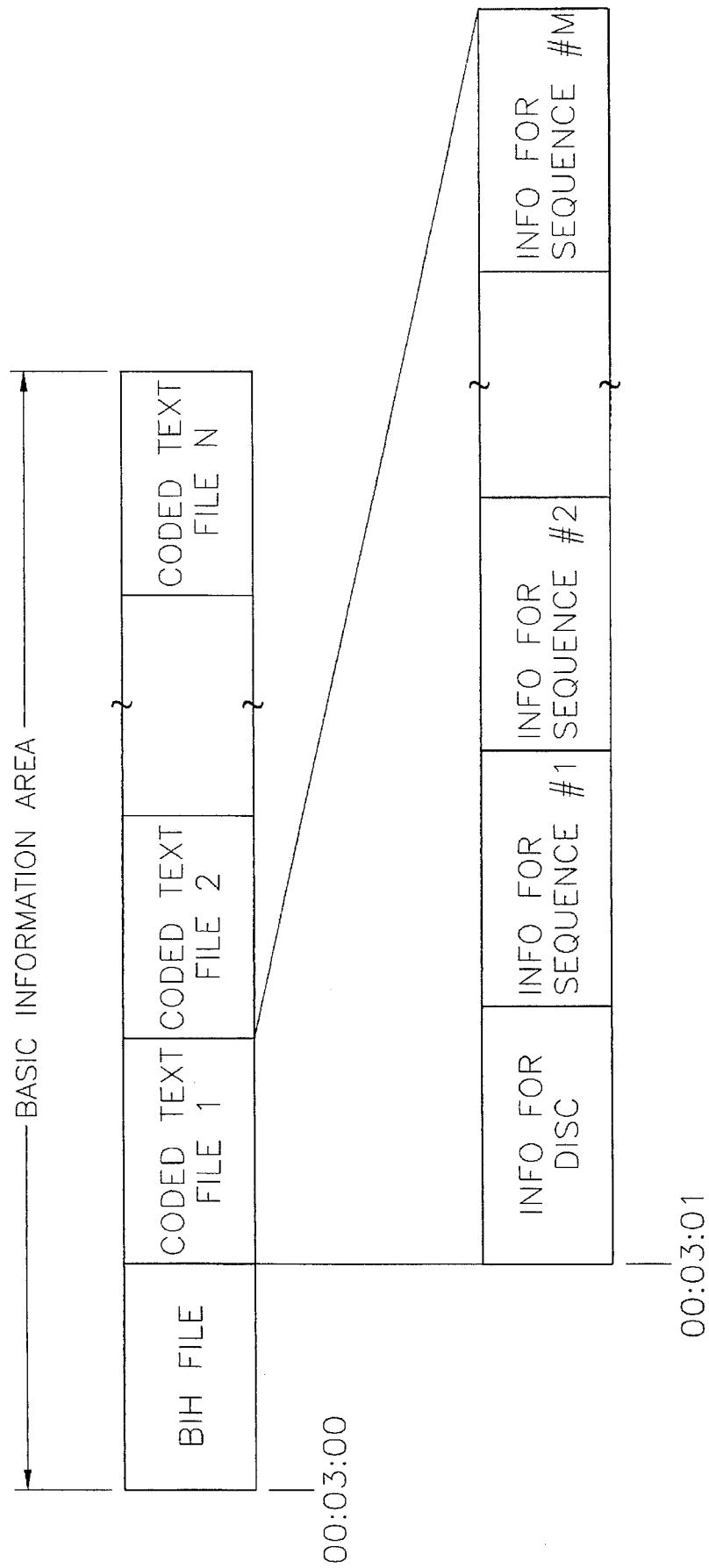
FIG. 4 is a schematic diagram for illustrating a structure of the karaoke basic information area in the directory "KARAOKE" as shown in FIG. 2.

FIG. 4 is a schematic diagram for illustrating a structure of the karaoke basic information area in the directory "KARAOKE" as shown in FIG. 2. As shown in FIG. 4, the karaoke basic information area in the directory "KARAOKE" basic information header (BIH) file located at sector "00: 03: 00–00: 03: 01" and code text 1 to N files. Each of the code text files has a disc information and sequence information 1 to N.

FIG. 5 is a schematic diagram for showing an "LOT.VCD" layout in the directory "VCD" as shown in FIG. 3. As shown in FIG. 5, the table structure of a "LOT.VCD" in the "VCD" directory as shown in FIG. 3 has a selection list 1 and a selection list 2, display lists 1 to 5 for displaying on a screen, with respect to list ID 1 to 7.

FIG. 6 is a schematic diagram for showing a "PSD.VCD" layout in the directory "VCD" directory as shown in FIG. 3. As shown in FIG. 6, the "PSD.VCD" structure in the "VCD" directory as shown FIG. 3 has a display sequence of a "LOT.VCD" shown FIG. 5 defined in a byte unit form.

Figure 7:
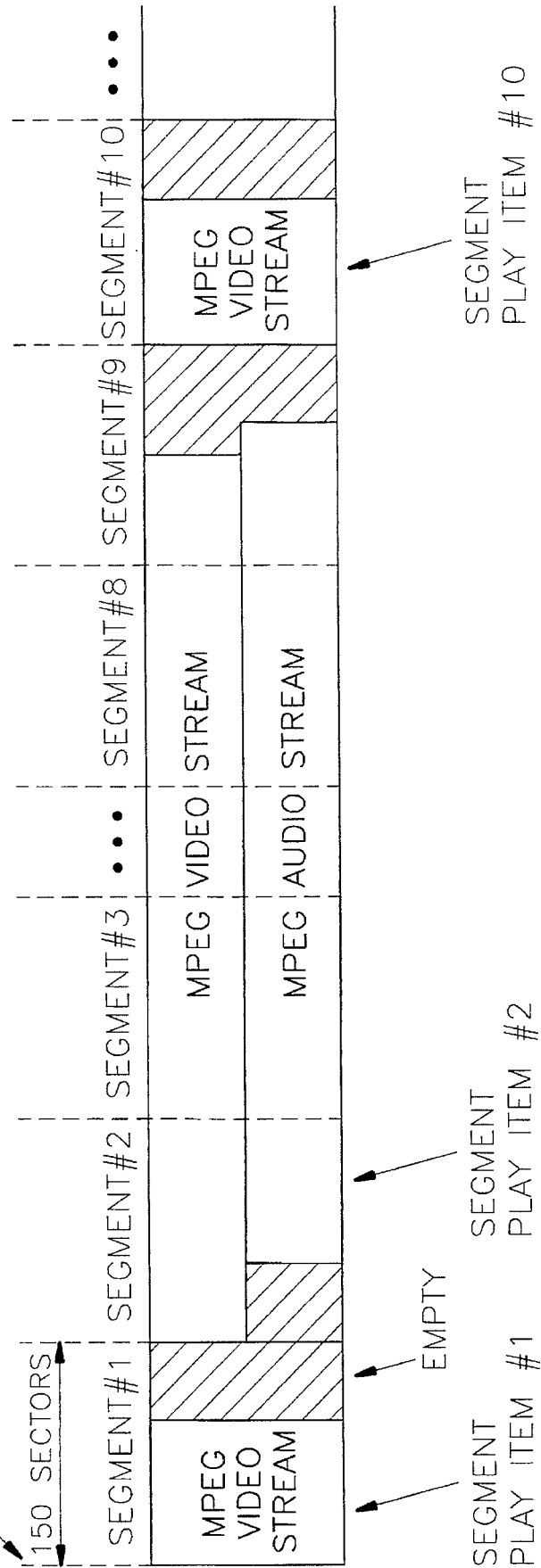
FIG. 7 is a schematic diagram for showing an example of segment play items in the directory "SEGMENT" as shown in FIG. 3.

FIG. 7 is a schematic diagram for showing an example of segment play items in the directory "SEGMENT" as shown in FIG. 3. As shown in FIG. 7, the data structure of the segment play items in the directory "SEGMENT" shown in FIG. 3 has 10 segment play items. Each of the segment play item has about 150 sectors from a beginning sector of the segment play item and an MPEG audio stream and an MPEG video stream for display.

FIGS. 8A to 8G are schematic diagrams for showing examples of the selection list and the play list as shown in FIGS. 5 and 6, and FIGS. 9A to 9K are schematic diagrams for showing the processing and display sequence of picture play items and segment play items in the directory "SEGMENT" as shown in FIG. 7 according to the selection list and the display list as shown in FIGS. 8A to 8G. The sequence information of play item for "PSD.VCD" in the directory "VCD", at first a still picture play item #1000 is displayed from a selection 1 ($0000) for an interactive display (see FIG. 3). In the situation (see FIG. 9A), a selectionable item such as a first selection item (Sel #1 $0004), a second selection item (Sel #2 $0010), and a third selection item (Sel #3 $0013) is displayed. Then, in the selection item, for instance, when the first selection item (Sel #1 $0004) is selected, a still picture play item #1001 is displayed from selection list 2 ($0200). Then when a following screen, that is, a first selection item (Sel #1 $0008), a second selection item (Sel #2 $000B), or a third selection item (Sel #3 $000D) is selected, a picture play item #1 track 2 (see FIG. 9E) and a play item #2 track 3 (see FIG. 9F), a play item #1 1002 (see FIG. 9C), and a play item #1022 (see FIG. 9D) and a play item #2 8 (FIG. 9K) which are defined in a play list 1 $0040, a play list 2 $0058, and a play list 3 $0068, are reproduced, respectively.

Figure 10:
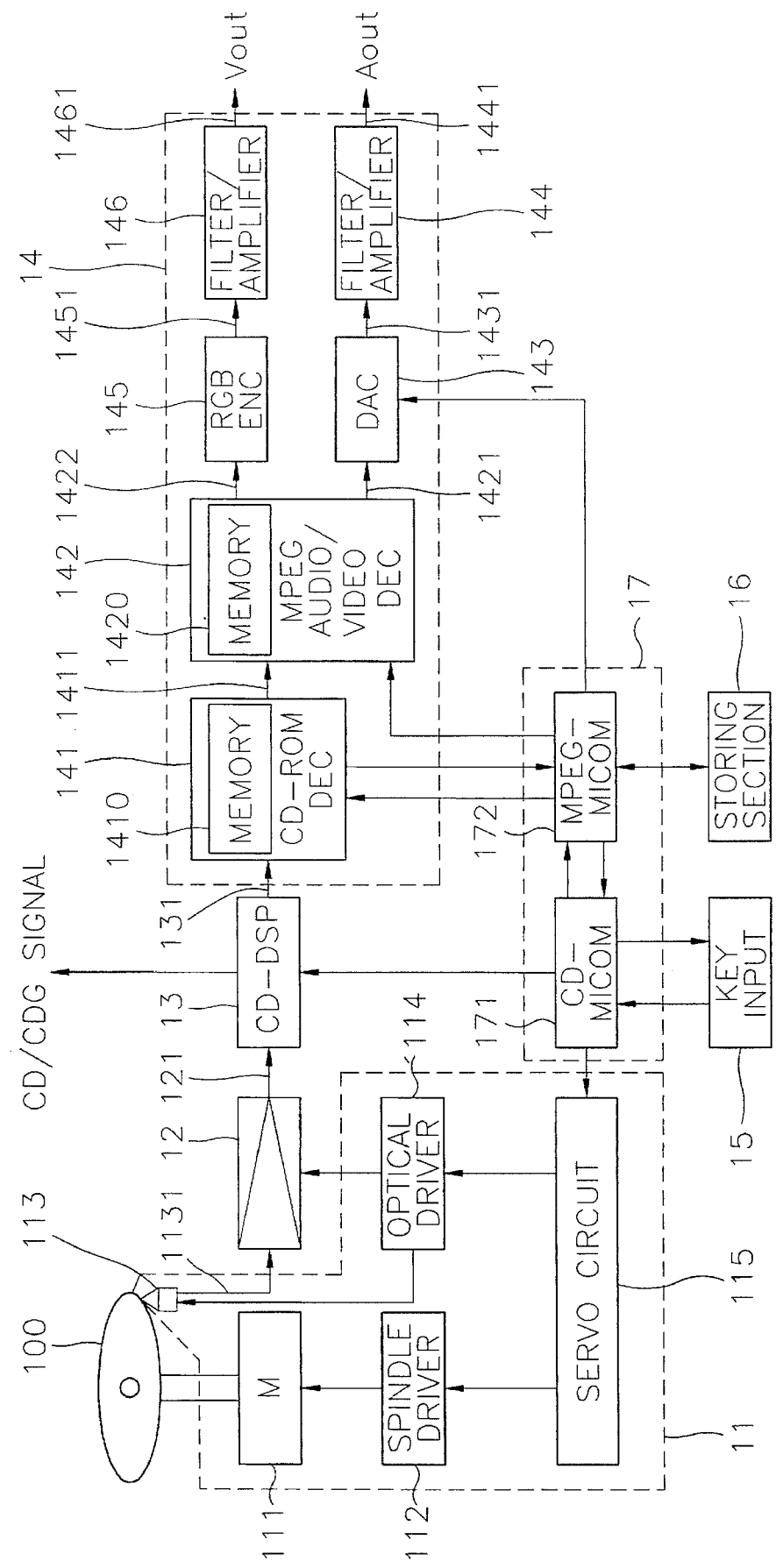
FIG. 10 is a block diagram for showing the configuration of an information reproducing apparatus which can be used in the present invention.
Figure 11A:
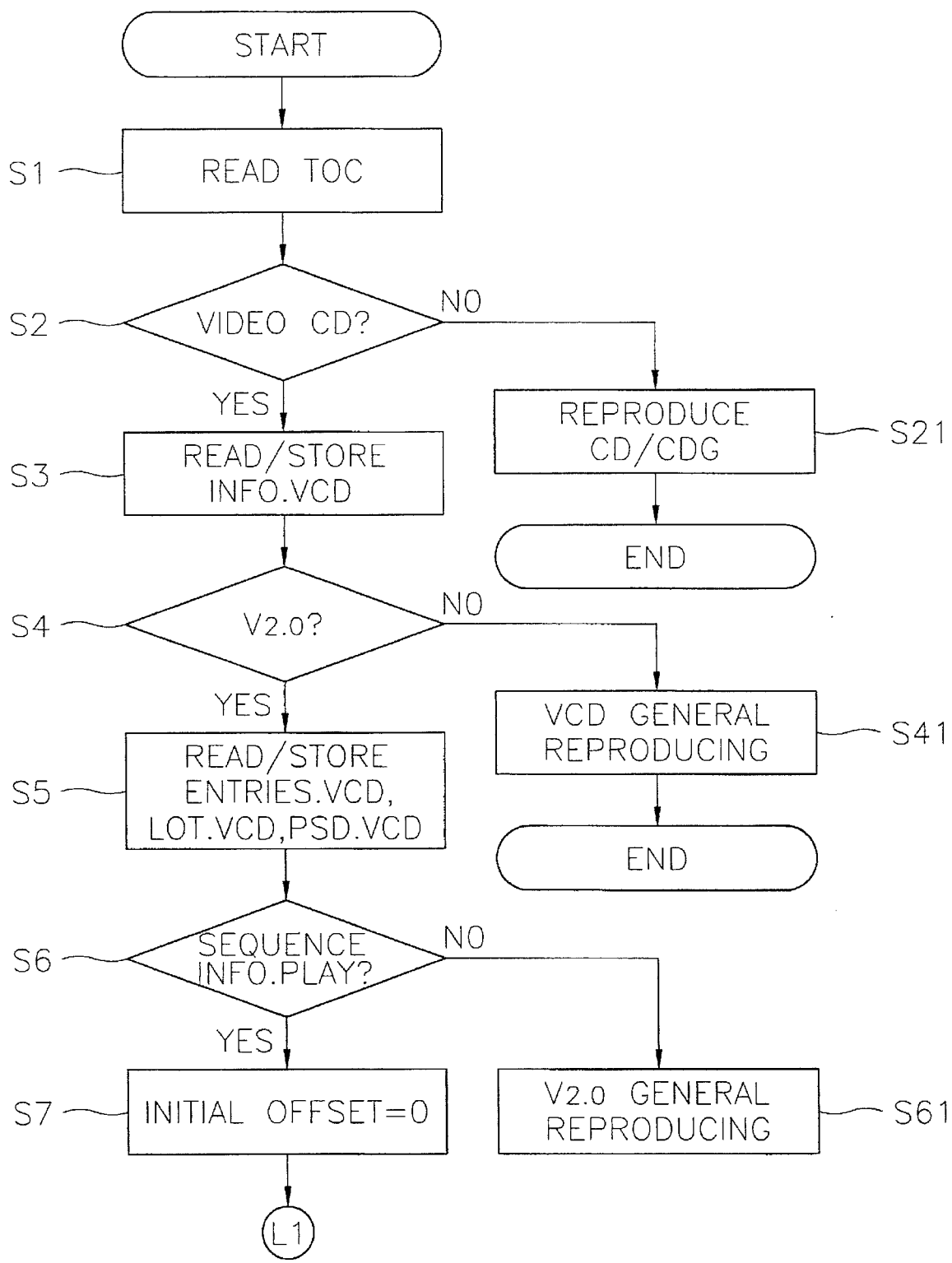
FIGS. 11A to 11G is a flow chart for showing the sequentially displaying method of an interactive information recording medium according to an embodiment of the present invention.
Figure 11B:
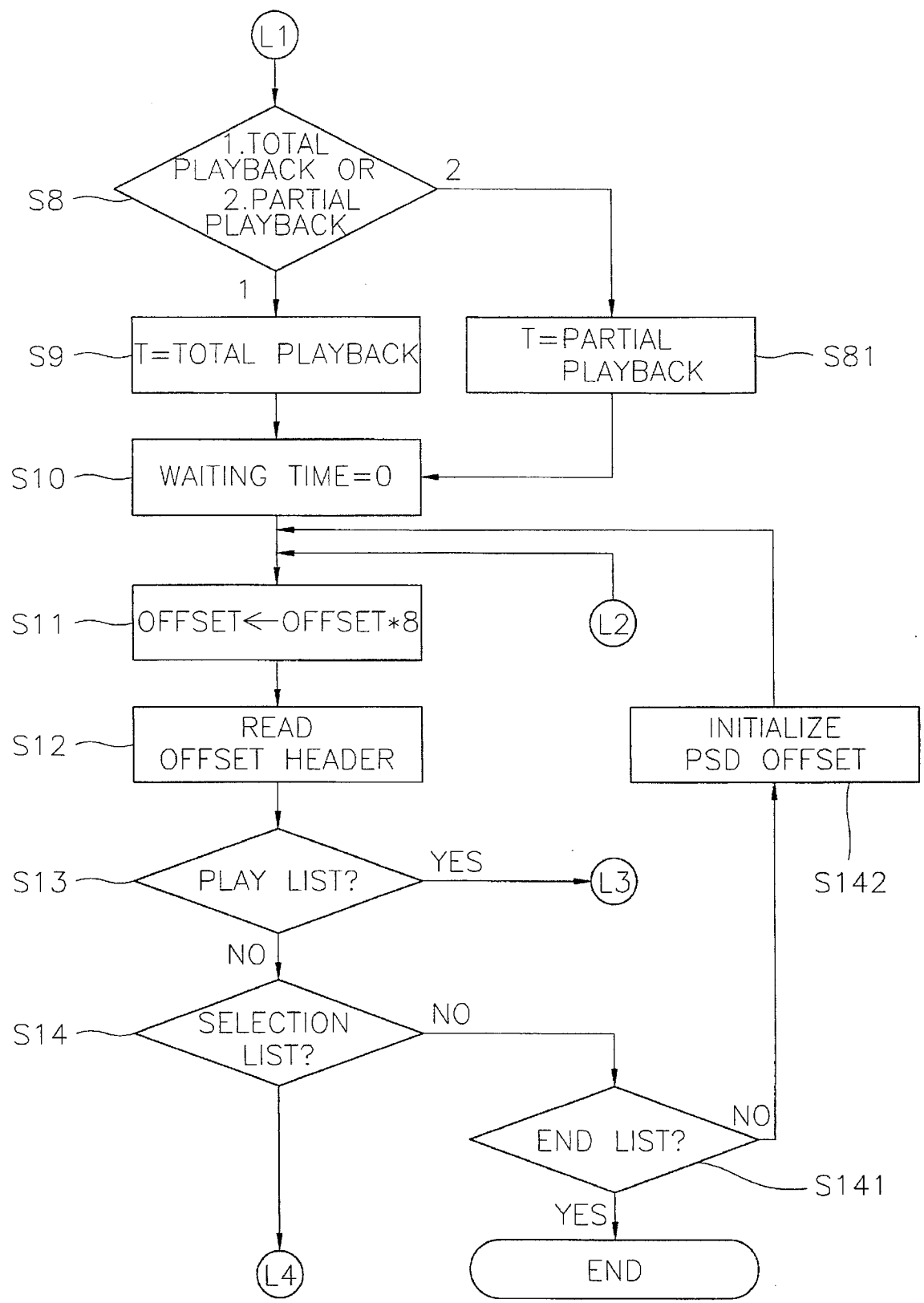
Figure 11C:
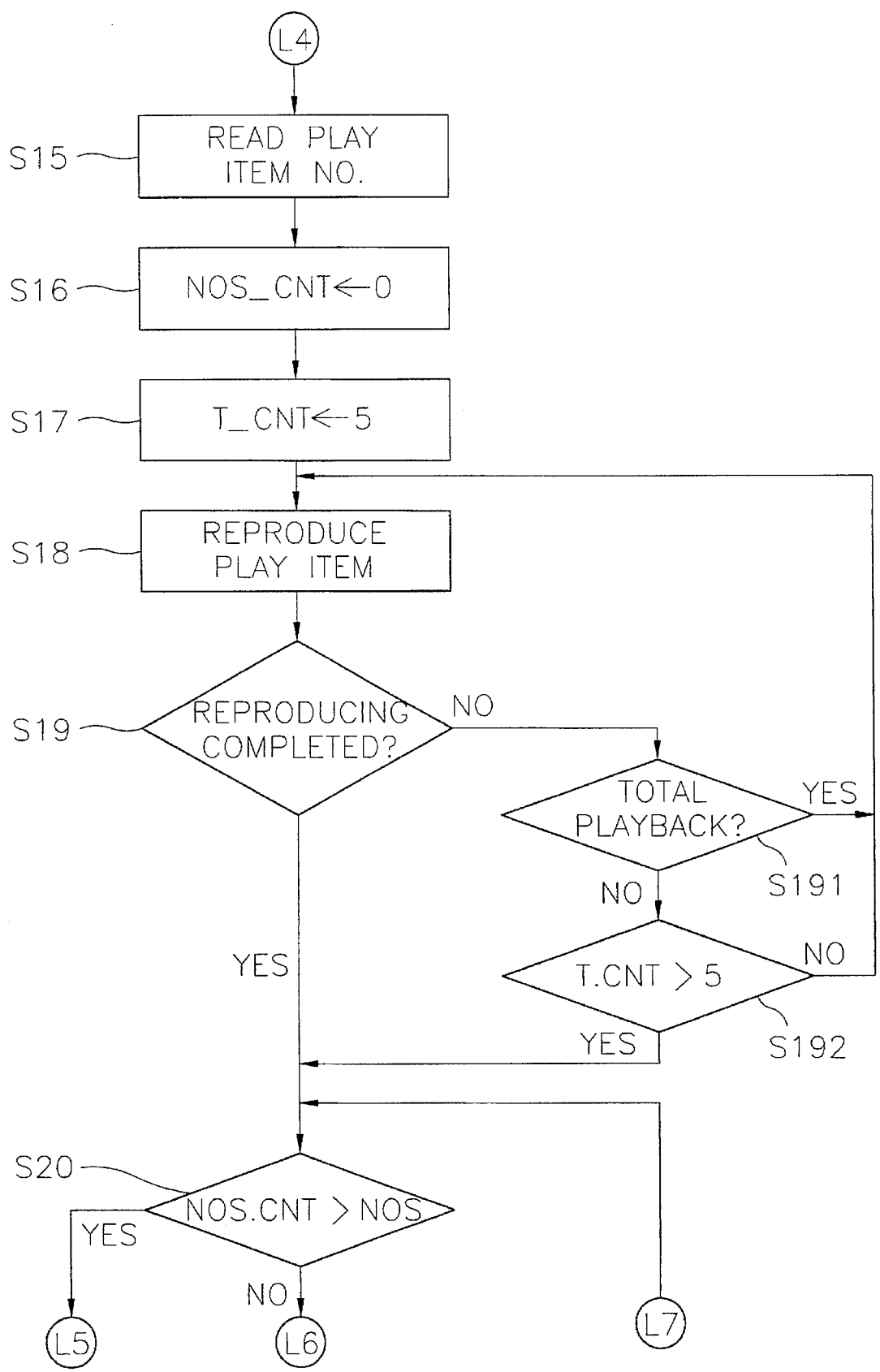
Figure 11D:
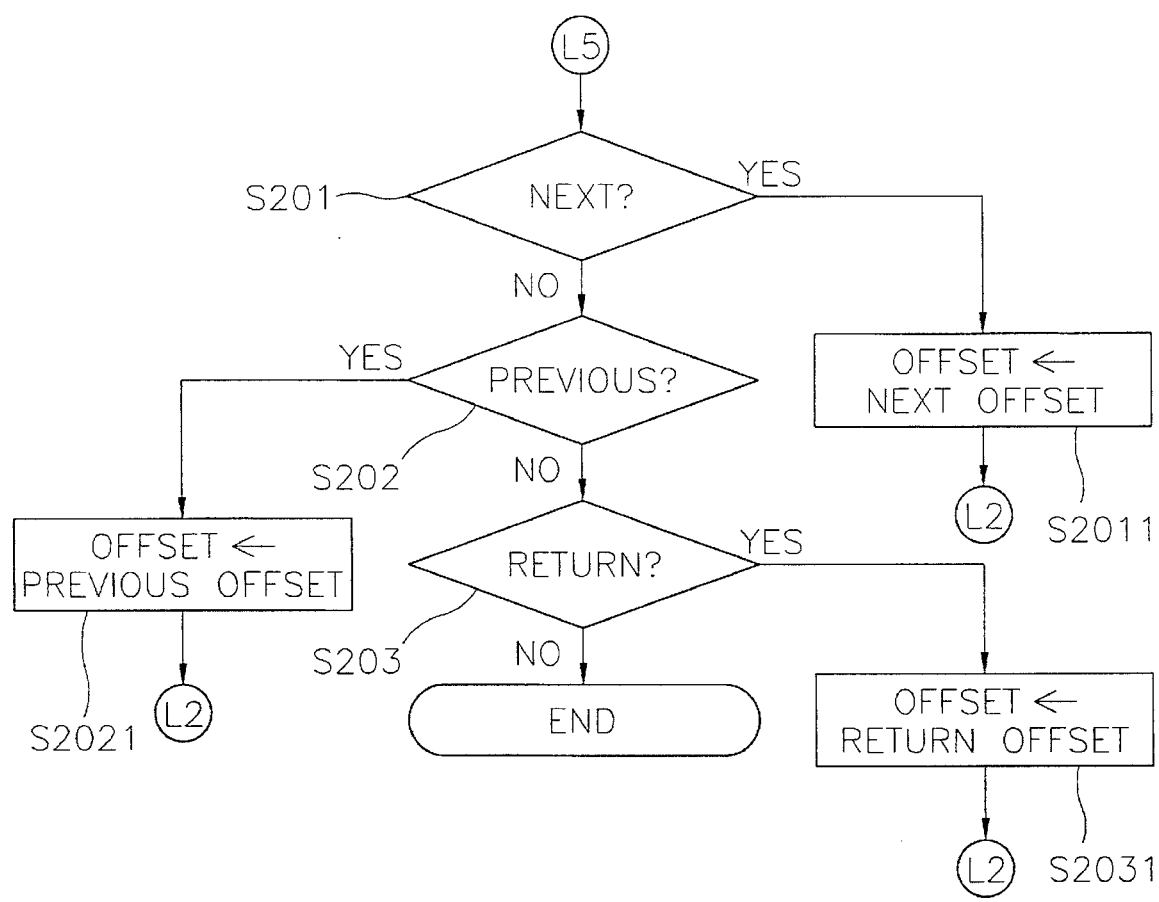
Figure 11E:
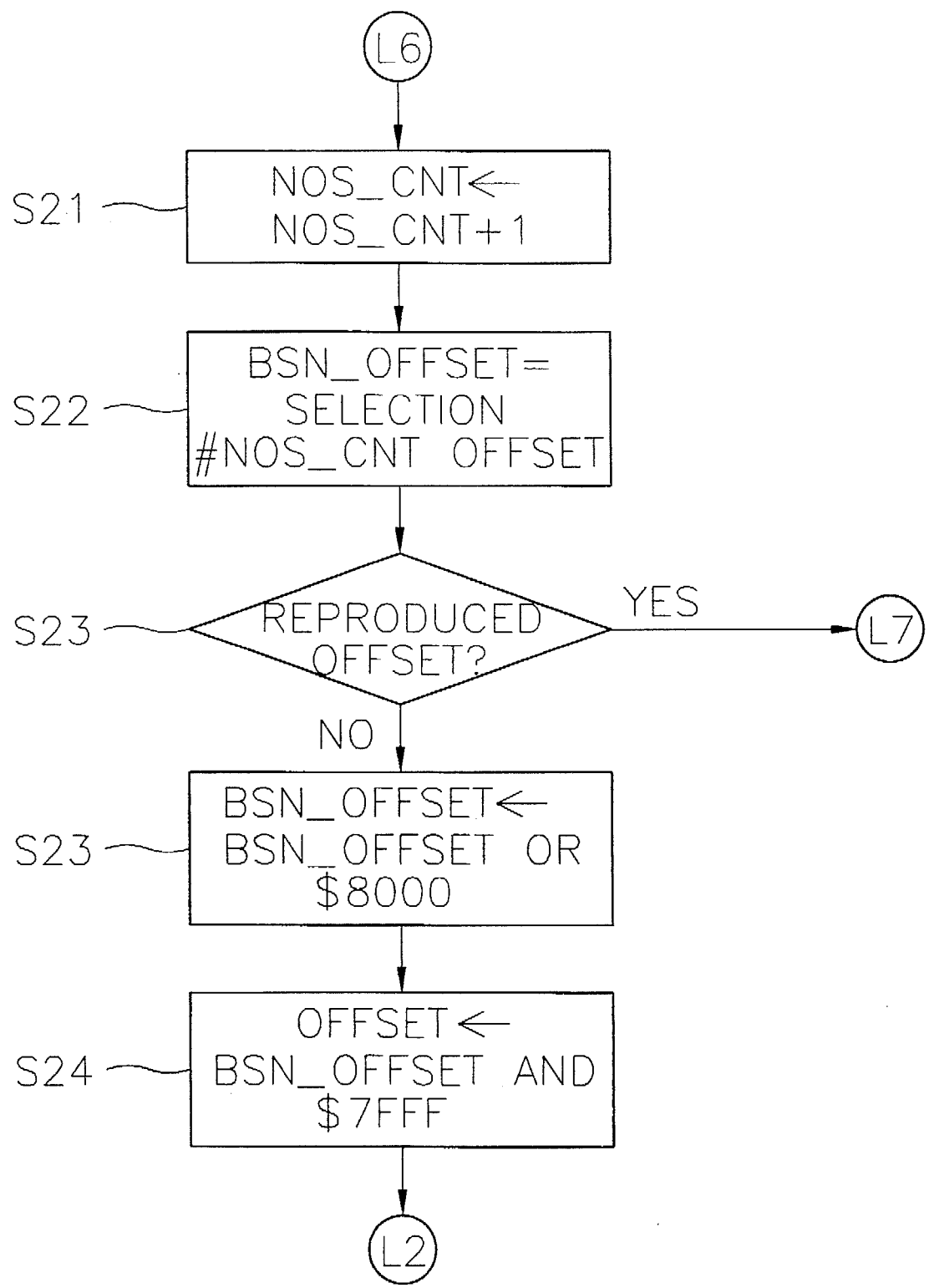
Figure 11F:
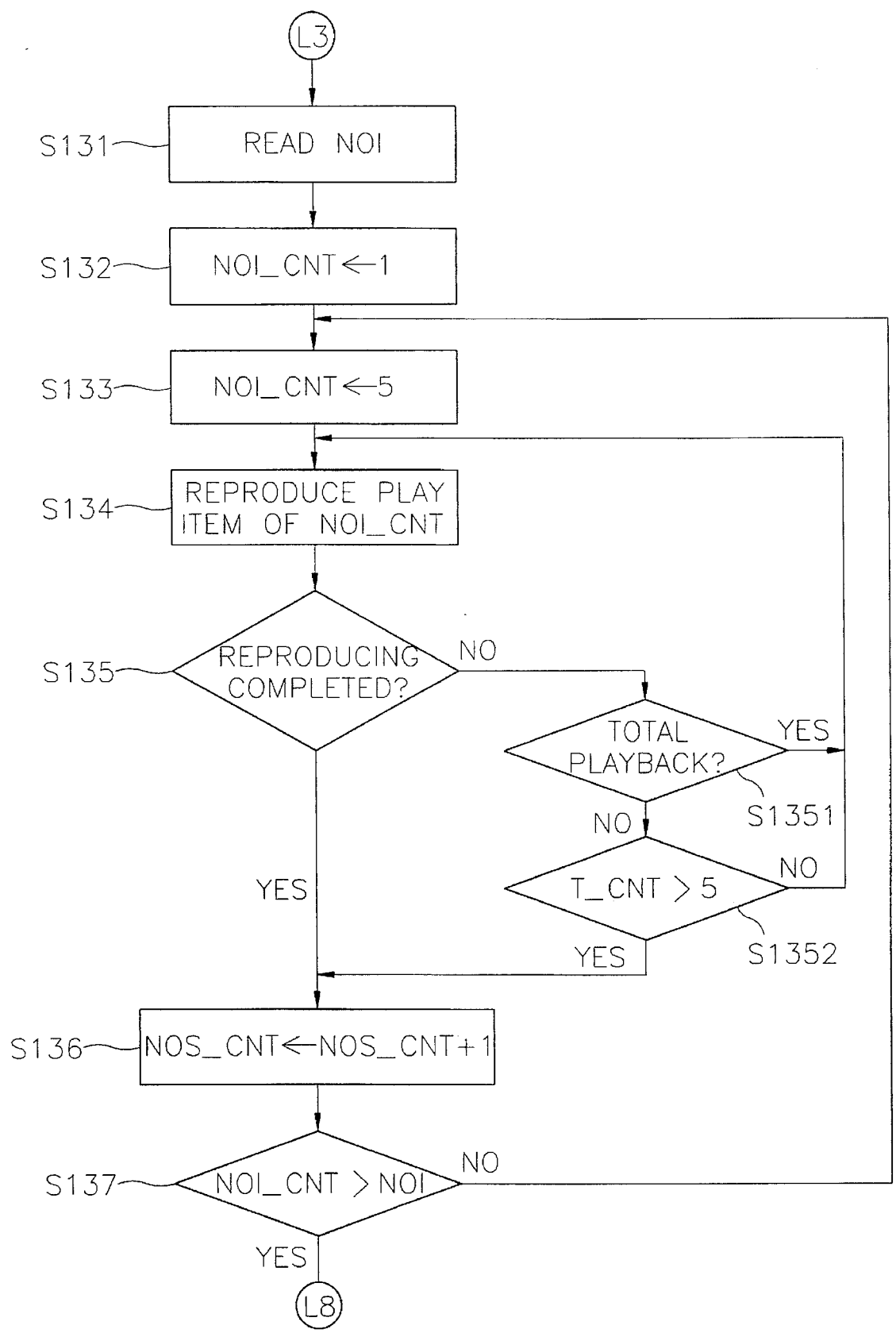
Figure 11G:
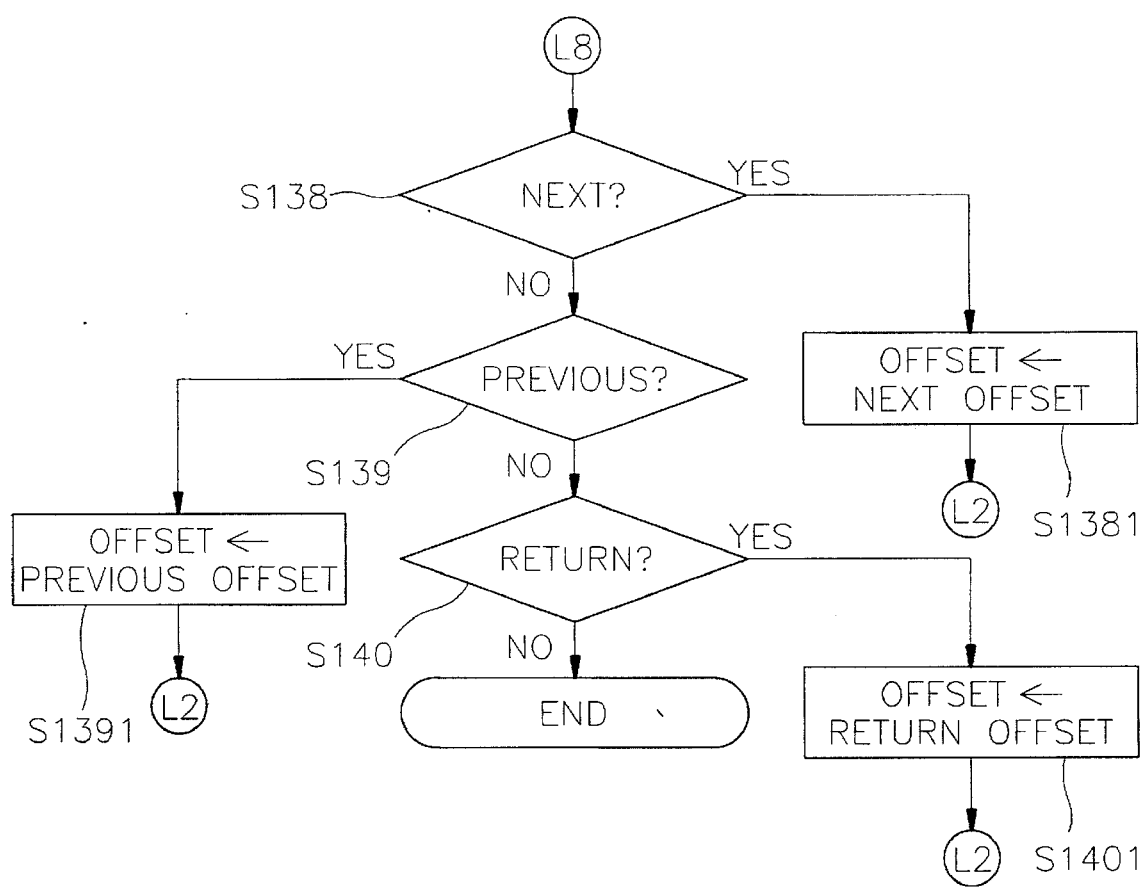

FIG. 10 is a block diagram for showing the configuration of an information reproducing apparatus 10 which can be used in the present invention. The reference numeral 100 represents an information recording medium which is reproduced by an information reproducing apparatus 10.

A data reading section 11 reads out information data recorded in disc information (INFO.VCD) files, ENTRIES.VCD files, list identification offset table (LOT).VCD files, play sequence descriptor (PSD).VCD files of the video compact disc which is loaded on information apparatus 10 and outputs a data reading signal 1131. Data reading section 11 includes a spindle motor 111, a spindle driving section 112, an optical pickup 113, an optical pickup driving section 114, a servo circuit 115. Spindle motor 111 rotates the information recording medium 100 at a constant speed under the control of a compact disc (CD)-micom 171 of a control section 17 which will be described later, so that information recording medium 100 is reproduced normally. Spindle driving section 112 controls the driving of spindle motor 111. Optical pickup 113 reads out information from information recording medium 100 and outputs data reading signal 1131. Optical pickup driving section 114 controls the operation of optical pickup 113. Servo circuit 115 controls the servo of spindle motor 111 which drives information recording medium 100 at a constant speed, and the focusing/tracking servo of optical pickup 113 through spindle driving section 112 and optical pickup driving section 114, respectively.

A radio frequency (RF) amplifier 12 amplifies the data reading signal 1131 from optical pickup 113 of data reading section 11 and outputs an amplified signal 121.

A CD-DSP 13 processes the amplified signal 121 from RF amplifier 12 into a digital signal and separately outputs a video CD signal 131, an audio CD signal, and a CDG signal under control of CD-micom 171. When information recording medium 100 is an audio CD or a CDG, the reproducing operation of information recording medium 100 is carried by sequentially processing these signals in a CD/CDG processing device (not shown).

An MPEG processing section 14 decodes the video CD signal 131 from CD-DSP 13 into the suitable CD-ROM data format in an MPEG manner, converts it into the analog signals, and outputs aural/motion the image signals 1441 and 1461. MPEG processing section 14 includes a CD-ROM decoder 141 having a first memory 1410, an MPEG audio/video decoder 142 having a second memory 1420, a digital-to-analog (D/A) converter 143, a first filter/amplifier 144, an RGB encoder 145, and a second filter/amplifier 146. CD-ROM decoder 141 decodes the video CD signal 131 from CD-DSP 13 into the suitable CD-ROM data format and outputs a CD-ROM-decoded signal 1411. First memory 1410 is comprised of a static random access memory (SRAM) and has the necessary program for the decoding operation which is stored therein. MPEG audio/video decoder 142 decodes the CD-ROM-decoded signal 1411 from CD-ROM decoder 141 in an MPEG manner and outputs MPEG aural/motion image signals 1421 and 1422. In second memory 1420, an MPEG program is stored. D/A converter 143 analog-converts the decoded MPEG aural signal 1421 from MPEG audio/video decoder 142 and outputs an analog-converted MPEG aural signal 1431. First filter/amplifier 144 filters/amplifies the analog-converted MPEG aural signal 1431 and outputs a filtered/amplified aural signal 1441. RGB encoder 145 encodes the MPEG motion image signal 1422 from MPEG audio/video decoder 142 and outputs an RGB signal 1451 for display. Second filter/amplifier 146 filters/amplifies the RGB signal 1451 from RGB encoder 145 and outputs a filtered/amplified motion image signal 1461.

A key input section 15 generates commands for controlling operation menus of information reproducing apparatus 10 having a command to set a sequence information play mode.

A storing section 16 temporarily stores the video CD signal 131 from CD-DSP 13 having information data recorded in disc information files, ENTRIES.VCD files, LOT.VCD files, and PSD.VCD files.

A control section 17 controls the operation of data reading section 11 according to the operation of key input section 15 to judge whether or not a sequence information play mode is selected based on the information data stored in storing section 16, sets a playback time in accordance with the sequence information play mode, judges whether a list selected according to an operation of the key input section 15 is a selection list or play list by confirming the offset header of play sequence descriptor.VCD files, and controls an operation of MPEG processing section 14 for sequentially reproducing information data of the selected list for the playback time. Control section 17 includes a CD-micom 171 and an MPEG-micom 172. CD-micom 171 controls an operation of data reading section 11 according to an operation of key input section 15 so that data reading section 11 can read information data which are recorded on information recording medium 100, and discriminates whether information recording medium 100 is a video CD, an audio CD, or a CDG based on the table-of-contents (TOC) data of information recording medium 100 which have been processed into a digital signal by CD-DSP 13. MPEG-micom 172 judges whether or not a sequence information play mode is selected by the user's operation, sets a playback time according to the sequence information play mode, judges whether a list selected by an operation of the key input section 15 is a selection list or a play list by confirming the offset header which is defined in the PSD.VCD files stored in storing section 16, controls an operation of MPEG processing section 14 for sequentially reproducing information data of the selected list for the set playback time, and has a counter for setting and counting the playback time for a sequence information play with respect to the reproducing list.

Hereinafter, the method for sequentially displaying of an interactive information recording medium according to an embodiment of the present invention will be described in detail, with reference to FIGS. 11A through 11G.

When information recording medium 100 is loaded on information reproducing apparatus 10 by a user, optical pickup 113 of data reading section 11 reads TOC data recorded in the lead-in area of information recording medium 100 under the control of CD-micom 171 of control section 17 in step S1.

Then, CD-micom 171 judges whether or not information recording medium 100 is a video CD by discriminating whether a PSEC of A0 in the Q channel of the sudcode from the read TOC data is $20 indicating CD-ROM XA in step S2. When it is judged that the PSEC is $29, information recording medium 100 is regarded as the video CD.

According to the judgement in step S2, if information recording medium 100 is an audio CD or a CDG not the video CD, the routine goes to step S21 so that the corresponding disc is reproduced by the CD/CDG device. If information recording medium 100 is a video CD, MPEG-micom 172 reads out disc information "INFO.VCD" located at sector "00: 04: 00" in the directory "VCD" as shown in FIGS. 2 and 3, and then stores these data in storing section 16 in step S3.

Subsequently, MPEG-micom 172 judges whether or not the video CD is an interactive video CD (video CD version 2.0) in step S4. That is, when a specification version number defined in the "INFO.VCD" data is "$0101", the video CD is judged as a general video CD (video CD version 1.01), and the specification version number defined in the "INFO.VCD" data is "$0200", the video CD is judged as an interactive video CD (video CD version 2.0).

According to the result of the judgement in step S4, if the video CD is not an interactive video CD, the routine goes to step S41 so that a general reproducing operation for the video CD is performed. If the video CD is an interactive video CD (video CD version 2.0), MPEG-micom 162 reads out a user's control function file composed of an "ENTRIES.VCD", an "LOT.VCD", and a "PSD.VCD" in the directory "VCD" and stores them in storing section 16 in step S5.

Then, MPEG-micom 172 of control section 17 judges whether or not a sequence information play mode is selected according to the operation of key input section 16 in step S6.

According to the result of the judgement in step S6, if the sequence information play mode is not selected, the routine goes to step S61 so that a play function operation is performed with respect to the interactive video CD by a general interactive manner. If the sequence information play mode is selected, MPEG-micom 172 initializes an offset of "PSD.VCD" as "0"($0000) in step S7.

Then, MPEG-micom 172 judges whether a total or partial playback for the sequence information is selected according to the operation of key input section 16 in step S8.

According to the result of the judgement in step S8, if the total playback is selected, MPEG-micom 172 sets the total playback time with respect to the interactive video CD in step S9. If the partial playback is selected, MPEG-micom 172 sets the predetermined playback time with respect to the interactive video CD, e.g. for 5 seconds in step S81.

After the steps S9 and S81 are completed, MPEG-micom 172 sets the waiting time "0" in step S10.

Then, MPEG-micom 172 multiplies the initialized offset "$0000" by 8 in step 11. Thus, the offset comes to have the value of "$0000" (offset=$0000*8=$0000).

Then, MPEG-micom 172 reads out the offset header from the "PSD.VCD" which is stored in storing section 16 in step S12.

Subsequently, MPEG-micom 172 judges whether or not a current list (offset $0000 see FIG. 8A) is a play list in step S13. The list is judged as a play list when the offset header of the "PSD.VCD" which has been read out as above is $10.

According to the result of the judgement in step S13, since the current list (offset $0000, see FIG. 8A) is $18, the current list is not a play list. Accordingly, the routine goes to step S14, and MPEG-micom 172 judges whether or not a current list (offset $0000, see FIG. 8A) is a selection list. The list is judged as a selection list if the offset header is $18 in the "PSD.VCD" which has been read out as above.

According to the result of the judgement in step S14, since the current list (offset $0000, see FIG. 8A) is $18, the current list is a selection list (selection list 1, FIG. 8A). Accordingly, the routine goes to step S15, and MPEG-micom 172 reads out a play item number which is defined in the selection list 1. At this time, the play item number of the selection list 1 is 3 shown in FIG. 8A having a Sel #1 $0004, a Sel #2 $0010, and a Sel #1 $0013.

Then, MPEG-micom 172 initializes a counter of MPEG-micom 172 so that the selection item number is "0" in step S16, and sets the counting time in the counter at 5 seconds in step S17.

Figures 9A, 9B, 9C, 9D:
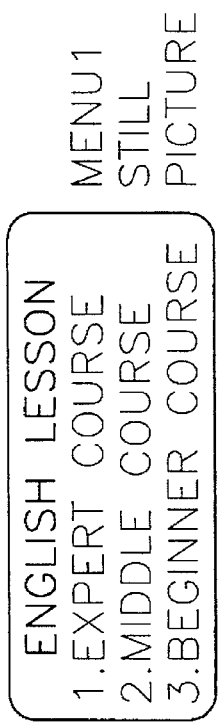

Then, a play item 1000 is displayed on a display device (not shown) shown in FIG. 9A in step S18.

MPEG-micom 172 judges whether or not the display for the play item 1000 is completed in step S19.

According to the result of the judgement in step S19, when the playback for the play item 1000 is not completed, the routine goes to step S191 and MPEG-micom 172 judges whether or not the play item 1000 is a total playback mode.

According to the result of the judgement in step S191, if the play item 1000 is the total playback mode, the routine returns to the step S18 and performs the operation after the step S18. However, if the play item 1000 is not the total playback mode, the routine goes to the step S192 so that MPEG-micom 172 judges whether or not the counting time in the step S16 is larger than 5 seconds.

According to the result of the judgement in step S192, when the counting time in the step S16 is not larger than 5 seconds, the routine returns to the step S18 so that the operation after the step S18 is performed. When the counting time in the step S16 is larger than 5 seconds according to the result of the judgement in step S192, or when the display for the play item 1000 is completed according to the result of the judgement in step S19 (when the playback time of the play item 1000 is smaller than 5 seconds), MPEG-micom 172 judges whether or not the selection item number "0" which is counted in the step S16 is larger than the selection item number "3" (see FIG. 8A) recorded in the selection list 1 in step S20.

According to the result of the judgement in step S20, because the counted selection item number "0" is smaller than the selection item number "3" recorded in the selection list 1, the routine goes to step S21 and the counter adds "1" to "0" the selection item number, that is, the selection item number is increased from "0" to "1".

Then, MPEG-micom 172 reads out the offset $0004 of the Sel #1 according to the one-added selection item number as the offset of a base of selection number (BSN) in the selection list 1 in step S22.

Then, MPEG-micom 172 judges whether or not the read offset $0004 of the Sel #1 is a reproduced offset in step S23. In this case, when the most significant bit (MSB) of an offset is "0", the offset is not judged as a reproduced offset, when the MSB of a offset is not "0", the offset is judged as a reproduced offset.

According to the result of the judgement in step S23, because the MSB in the read offset $0004 of the Sel #1 is "0", MPEG-micom 172 judges the Sel #1 of the selection list 1 as a non-reproduced item. Thus, the routine goes to step S24 and MPEG-micom 172 logically OR-combines the read offset $0004 (a MSB "0") and $8000 so that an offset $8004 (a MSB "1") is obtained as a reproduced offset.

Then, MPEG-micom 172 logically AND-combines the reproduced offset $8004 (a MSB "1") and $7FFF and returns to the original offset $0004 (a MSB "0") in step S25.

Then, the routine returns to the step S11 and MPEG-micom 172 multiplies the returned offset "$0004" by 8 so that a new offset "$0020" ($0004*8=$0020) is obtained.

Then, MPEG-micom 172 reads out the offset header from the "PSD.VCD" which is stored in storing section 16 in step S12 as described above.

Subsequently, MPEG-micom 172 judges whether or not a current list (offset $0020 FIG. 8B) is a play list in step S13.

According to the result of the judgement in step S13, since the current list (offset $0020, see FIG. 8B) is $18, the current list is not a play list. Accordingly, the routine goes to step S14, and MPEG-micom 172 judges whether or not a current list (offset $0020, see FIG. 8B) is a selection list. That is, the list is judged as a selection list where the offset header is $18.

According to the result of the judgement in step S14, since the current list (offset $0020, see FIG. 8B) is $18, the current list is a selection list (selection list 2, see FIG. 8B). Accordingly, the routine goes to step S15, and MPEG-micom 172 reads out a play item number which is defined in the selection list 2. At this time, the play item number of the selection list 2 is 3 as shown in FIG. 8B since the selection list 2 has a Sel #1 $0008, a Sel #2 $000B, and a Sel #1 $000D which have been previously reproduced.

Then, MPEG-micom 172 initializes a counter of MPEG-micom 172 the selection item number to be "0" in step S16, and sets the counting time in the counter 5 seconds in step S17.

Then a play item 1001 has been displayed on a CRT device (not shown) shown in FIG. 9A in step S18.

MPEG-micom 172 judges whether or not the display for the play item 1000 is completed in step S19.

According to the result of the judgement in step S19, if the display for the play item 1001 is not completed, the routine goes to step S191 and MPEG-micom 172 judges whether or not the play item 1001 is a total playback mode.

According to the result of the judgement in step S191, if the play item 1001 is the total playback mode, the routine returns to the step S18 and repeats the operation after the step S18. However, if the play item 1001 is the total playback mode, the routine goes to the step S192 and MPEG-micom 172 judges whether or not the counting time in the step S16 is larger than 5 seconds.

According to the result of the judgement in step S192, when the counting time in the step S16 is not larger than 5 seconds, the routine returns to the step S18 and repeats the operation after the step S18. When the counting time in the step S16 is larger than 5 seconds according to the result of the judgement in step S192, or when the display for the play item 1000 is completed according to the result of the judgement in step S19 (when the playback time of the play item 1000 is smaller than 5 seconds), MPEG-micom 172 judges whether or not the selection item number "0" which is counted in the step S16 is larger than the selection item number "3" (FIG. 8B) recorded in the selection list 1 in step S20.

According to the result of the judgement in step S20, because the counted selection item number "0" is smaller than the selection item number "3" recorded in the selection list 1, the routine goes to step S21 and the counter adds "1" to "0" the selection item number, that the selection item number is increased from "0" to "1".

Then, MPEG-micom 172 reads out the offset $0004 of the Sel #1 according to the 1-added selection item number as the offset of a base of selection number(BSN) in the selection list 2 in step S22.

MPEG-micom 172 judges whether or not the read offset $0004 of the Sel #1 is a reproduced offset. In this case, when the most significant bit (MSB) of a offset is "0", the offset is not judged as a reproduced offset, when the MSB of an offset is not "0", the offset is judged as a reproduced offset.

According to the result of the judgement in step S23, because the MSB in the read offset $0008 of the Sel #1 is "0" in a binary number, MPEG-micom 172 judges the Sel #1 of the selection list 2 a non-reproduced item. Then, the routine goes to step S24 and MPEG-micom 172 logically OR-combines the read offset $0008 (a MSB "0") and $8000 and gets a offset $8008 (a MSB "1") as a reproduced offset.

Then, MPEG-micom 172 logically AND-combines the reproduced offset $8008 (a MSB "1") and $7FFF and returns to the original offset $0008 (a MSB "0") in step S25.

After the step S25, as the above mentioned manner, the routine returns to the step S11 and MPEG-micom 172 multiplies the offset "$0008" by 8 and gets "$0040".

Then, the MPEG-micom 172 reads out the offset headers from the "PSD.VCD" which are stored in the storing section 16 in step S12.

Subsequently, MPEG-micom 172 judges whether or not a current list (offset $0040 FIG. 8C) is a play list in step S13. The list is judged as a play list where the offset header is $10.

According to the result of the judgement in step S13, since an offset header of the current list (offset $0040, FIG. 8A) is $10, the current list is not a play list. Accordingly, the routine goes to step S131, and MPEG-micom 172 reads out a play item number which is defined in the play list 1. That is, the play item number of the play list 1 is 2 shown in FIG. 8A having a Play item #1 2 (track 2) and a Play item #2 3 (track 3).

Then, MPEG-micom 172 initializes a counter of MPEG-micom 172 the selection item number to be "1" in step S132, and sets the counting time in the counter 5 seconds in step S133.

Figure 9E:
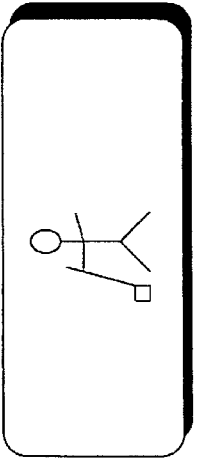
Figure 9F:
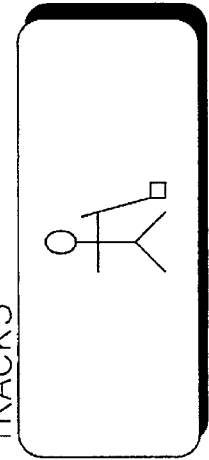
Figure 9G:
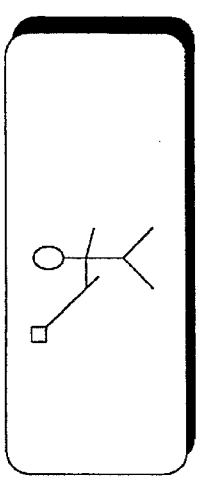
Figure 9H:
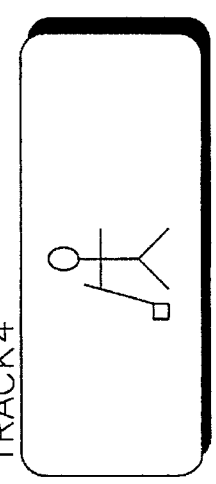

Then, the Play item #1 2 (track 2) of the play list 1 which is set and selected by the counter has been displayed on a CRT device (not shown) shown in FIG. 9E in step S134.

MPEG-micom 172 judges whether or not the display for the Play item #1 2 is completed in step S135.

According to the result of the judgement in step S135, if the display for the Play item #1 2 is not completed, the routine goes to step S1351 and MPEG-micom 172 judges whether or not the play item 1000 is a total playback mode.

According to the result of the judgement in step S1351, if the Play item #1 2 is the total playback mode, the routine returns to the step S134 and repeats the operation after the step S134. However, if the Play item #1 2 is the total playback mode, the routine goes to the step S1352 and MPEG-micom 172 judges whether or not the counting time in the step S133 is larger than 5 seconds.

According to the result of the judgement in step S1352, if the counting time in the step S133 is not larger than 5 seconds, the routine returns to the step S134 and repeats the operation after the step S134. If the counting time in the step S133 is larger than 5 seconds according to the result of the judgement in step S1352, or when the display for the Play item #1 2 is completed according to the result of the judgement in step S135 (when the playback time of the Play item #1 2 is smaller than 5 seconds), the counter adds "1" to "1" the play item number, that is, the play item number is increased from "1" to "2".

Then, MPEG-micom 172 judges whether or not the play item number ("2") which is counted in the step S136 is larger than the total play item number ("2", FIG. 8C) recorded in the play list 1 in step S137.

According to the result of the judgement in step S137, because the play item number "2" is not larger than the total play item number "2" recorded in the play list 1, the routine returns to step S133. As described above, an operation for the play item #2 3 of the play list 1 is carried from the step S134 to the step S136, as in that of the play item #1 2 of the play list 1.

Then, according to the result of the judgement in step S137, because the play item number "3" is larger than the total play item number "2" recorded in the play list 1, the routine goes to step S138, MPEG-micom 172 judges whether or not a next offset is in the play list 1.

According to the result of the judgement in step S138, because the next offset is in the play list 1, MPEG-micom 172 sets the next offset $0004 of the play list as a current offset in step S139.

Then, the routine returns to the step S11 and the MPEG-micom 172 multiplies the returned offset "$0004" by 8 and gets "$0020" ($0004*8=$0020).

Then, MPEG-micom 172 reads out the offset headers from the "PSD.VCD" which are stored in the storing section 16 in step S12 as described above.

Subsequently, MPEG-micom 172 judges whether or not a current list (offset $0020 FIG. 8B) is a play list in step S13.

According to the result of the judgement in step S13, since an offset header of the current list (offset $0020, see FIG. 8B) is $18, the current list is not a play list. Accordingly, the routine goes to step S14, and MPEG-micom 172 judges whether or not a current list (offset $0020, see FIG. 8B) is a selection list.

According to the result of the judgement in step S14, since an offset header of the current list (offset $0020, see FIG. 8B) is $18, the current list is a selection list. Accordingly, the routine goes to step S15, and MPEG-micom 172 reads out a play item number of the selection list 2 is 3 as shown in FIG. 8B having the reproduced Sel #1 $0008, a Sel #2 $000B, and a Sel #3 $000D.

As described above, an operation for the Sel #2 $000B is carried from the step S16 to the step S25, the step S13 and from the step S131 to the step S133, as in that of the Sel #1 $0008.

Then, the Play item #1002 of the play list 2 which is set and selected by the counter has been displayed on a CRT device (not shown) in FIG. 9C in step S134.

MPEG-micom 172 judges whether or not the display for the Play item #2 3 is completed in step S135.

According to the result of the judgement in step S135, when the display for the Play item #2 3 is not completed, the routine goes to step S1351 and MPEG-micom 172 judges whether or not the play item #1002 is a total playback mode.

According to the result of the judgement in step S1351, when the Play item #1 1002 is the total playback mode, the routine returns to the step S134 and repeats the operation after the step S134. However, when the Play item #1 2 is the total playback mode, the routine goes to the step S1352 and MPEG-micom 172 judges whether or not the counting time in the step S133 is larger than 5 seconds.

According to the result of the judgement in step S1352, if the counting time in the step S133 is not larger than 5 seconds, the routine returns to the step S134 and repeats the operation after the step S134. But if the counting time in the step S133 is larger than 5 seconds according to the result of the judgement in step S1352, or if the display for the Play item #1 2 is completed according to the result of the judgement in step S135 (when the playback time of the Play item #1 2 is smaller than 5 seconds), the counter adds "1" to "1" the play item number, that is, the play item number is increased from "1" to "2".

MPEG-micom 172 judges whether or not the play item number ("1") which is counted in the step S136 is larger than the total play item number ("2", FIG. 8C) recorded in the play list 1 in step S137.

According to the result of the judgement in step S138, because a next offset $0004 is in the play list 2, MPEG-micom 172 sets the next offset $0004 of the play list 1 as a current offset in step S1381 and the routine returns to the step S11 and repeats the operation after step S11.

According to the result of the judgement in step S138, if the next offset is not in the play list 2, the routine goes to the step S139 and MPEG-micom 172 judges whether or not a previous offset is in the play list 2.

According to the result of the judgement in step S139, if the previous offset is in the play list 2, MPEG-micom 172 sets the previous offset of the play list 2 as a current offset in step S1391 and the routine returns to the step S11 and repeats the operation after step S11. But if the previous offset is not in the play list 2, the routine goes to the step S140 and MPEG-micom 172 judges whether or not a return offset is in the play list 2.

According to the result of the judgement in step S140, if the return offset is in the play list 2, MPEG-micom 172 sets the return offset of the play list 2 as a current offset in step S1401 and the routine returns to the step S11 and repeats the operation after step S11. But if the return offset is not in the play list 2, the total routine is finished.

On the other hand, according to the result of the judgement in step S20, if the counted selection item number "0" is smaller than the selection item number "3" recorded in the selection list 1 or 2, that is, the 3 selection items in the selection list 1 (or the selection list 2) are reproduced completely, the routine goes to the step S201 and MPEG-micom 172 a next offset is in the selection list 1 (or the selection list 2).

According to the result of the judgement in step S201, if the next offset is in the selection list 1 (or the selection list 2), MPEG-micom 172 sets the next offset of the selection list 1 (or the selection list 2) as a current offset in step S1381 and the routine returns to the step S11 and repeats the operation after step S11. But, if the next offset is not in the selection list 1 or 2, the routine goes to the step S202 and MPEG-micom 172 judges whether or not a previous offset is in the selection list 1 or 2.

According to the result of the judgement in step S202, if the previous offset is in the selection list 1 or 2, MPEG-micom 172 sets the previous offset of the selection list 1 or 2 as a current offset in step S2021 and the routine returns to the step S11 and repeats the operation after step S11. But if the previous offset is not in the selection list 1 or 2, the routine goes to the step S203 and MPEG-micom 172 judges whether or not a return offset is in the selection list 1 or 2.

According to the result of the judgement in step S203, if the return offset is in the selection list 1 or 2, MPEG-micom 172 sets the return offset of the selection list 1 or 2 as a current offset in step S2031 and the routine returns to the step S11 and repeats the operation after step S11. But if the return offset is not in the selection list 1 or 2, the total routine is finished.

On the other hand, according to the result of the judgement in step S14, if the current list is not a selection list, the routine goes to step S141 and MPEG-micom 172 judges whether or not the current list is an end list.

According to the result of the judgement in step S141, if the current list is the end list, the routine is finished. But the current list is not the end list, MPEG-micom 172 initializes an offset of the PSD.VCD and returns to the step S11.

In a method of the present invention, In order to confirm all information recorded on an interactive information recording medium according to a user, a sequence information play mode is selected and the playback time is set. Then, the playback operation of the lists on which information are recorded according to the sequence information play mode is carried out for the set playback time. When a following play mode is, the playback for the following play mode may be performed, as stated above.

According to the present invention, all the items recorded on an interactive information recording medium are sequentially and automatically displayed for a total time or a partial time so that a user can confirm the all items. Also, the present invention may be applied to the case which a user confirms a specific item recorded on an interactive information recording medium for a specific time.

As described above, although illustrative embodiments of the present invention have been described in detail herein, it is to be understood that the invention is not limited to those precise embodiments, and that various changes and modifications may be effected herein by one skilled in the art without departing from the scope or spirit of the invention.

What is claimed is:

1. A method for sequentially displaying information of an interactive information recording medium, said method comprising the steps of:

i) reading disc information data which are recorded on a video compact disc;

ii) reading user's controlling files to store the user's controlling files in a storing means when the video compact disc is the interactive information recording medium, the user's controlling files including a play sequence descriptor file;

iii) initializing an offset of the play sequence descriptor file when a sequence information play mode is selected by a user;

iv) setting a play time according to a selection of playback modes, and setting a waiting time to be "0";

v) multiplying the initialized offset in the step iii) by a first number, to obtain a mutilplied value;

vi) reading an offset header from the play sequence descriptor files;

vii) reading out a play item number which is defined in a selection list, when the current list of the video compact disc is the selection list not a play list;

viii) initializing a selection item number of a counter, and setting a counting time of the counter to a first time;

ix) reproducing a selection item which is defined in the selection list;

x) judging whether or not the selection item number is larger than a total selection item number recorded in the selection list;

xi) increasing the selection item number by a second number when the selection item number is not larger than the total selection item number;

xii) reading an offset of the increased selection item number in the selection list as an offset of a first selection item selected;

xiii) judging whether or not the offset of a first selection item is a reproduced offset, if a most significant bit of the offset of a first selection item is a third number in a binary number so that the offset of the first selection item is judged as the reproduced offset, returning to the step x), and if the most significant bit of the offset of a first selection item is a fourth number in a binary number so that the offset of the first selection item is judged as the non-reproduced offset, logically OR-combining the offset of the first selection item and a fifth number to obtain a reproduced offset;

xiv) logically AND-combining the reproduced offset and a sixth number to return the original offset of the first selection item, and returning to the step v);

xv) reading out a play item number which is defined in the play list, when the current list of the video compact disc is the play list;

xvi) initializing a play item number of the counter, and setting a counting time of the counter to be the first time;

xvii) reproducing a play item which is defined in the play list;

xviii) increasing the counted play item number by a seventh number;

xix) judging whether or not the increased play item number is larger than a total play item number recorded in the play list; and xx) when the increased play item number is not larger than the total play item number recorded in the play list, returning to the step xv), and when the increased play item number is larger than the total play item number recorded in the play list, judging whether or not a next offset is in the play list.

2. The method for sequentially displaying information of an interactive information recording medium as claimed in claim 1, after the step of judging whether or not the next offset is in the play list, said method further comprising the step of:

q-a) according to the result of judgement of whether or not the next offset is in the play list, if the next offset is in the play list, setting the next offset as a current offset to return to the step e), and if the next offset is not in the play list, judging whether or not the previous offset is in the play list;

q-b) according to the result of judgement of whether or not the previous offset is in the play list in the step q-a), if the previous offset is in the play list, setting the previous offset as a current offset to return to the step e), and if the previous offset is not in the play list, judging whether or not the return offset is in the play list; and q-c) according to the result of judgement of whether or not the return offset is in the play list in the step q-b), if the return offset is in the play list, setting the return offset as a current offset to return to the step e), but if the return offset is not in the play list, finishing a total routine.

3. A method for sequentially displaying information of an interactive information recording medium, said method comprising the steps of:

a) reading disc information data which are recorded on a video compact disc where an information recording medium loaded on an information reproducing system is the video compact disc, to store the read disc information data in a storing means;

b) judging whether or not the video compact disc is an interactive information recording medium by reading a specification version number from the stored disc information data in the storing means, if the video compact disc is not the interactive information recording medium, performing a general reproducing operation for the video compact disc, and if the video compact disc is the interactive information recording medium, to read "ENTRIES.VCD" files, "list identification offset table.VCD" files, and "play sequence descriptor.VCD" files from the video compact disc, and storing the read "ENTRIES.VCD" files, the read "list identification offset table.VCD" files, and the read "play sequence descriptor.VCD" files in the storing means;

c) judging whether or not a sequence information play mode is selected by a user, if the sequence information play mode is not selected by the user, performing a general reproducing operation for the interactive video compact disc in an interactive manner by a selection of the user, and if the sequence information play mode is selected by the user, initializing an offset of the "play sequence descriptor.VCD" files stored in the storing means as $0000;

d) judging whether a total playback or a partial playback in the sequence information play mode is selected by the user, setting a play time according to the selection of the playback, and setting a waiting time to be "0";

e) multiplying the initialized offset $0000 in the step c) by 8, to get $0000;

f) reading an offset header from the "play sequence descriptor.VCD" files stored in the storing means, and judging whether a current list is a selection list or a play list;

g) reading out a play item number which is defined in the selection list, if the current list is the selection list according to the result of the judgment in the step f), initializing a selection item number of a counter to be "0", and setting a counting time of the counter to be 5 seconds;

h) reproducing a play item which is defined in the selection list;

i) judging whether or not the reproducing operation for the play item which is defined in the selection list is completed, if the reproducing operation for the play item is completed, judging whether or not the counted selection item number "0" by a counter in the step g) is larger than a selection item number recorded in the selection list;

j) according to the result of judgement of whether or not the counted selection item number "0" by a counter in the step g) is larger than a selection item number recorded in the selection list in the step i), if the counted selection item number is larger than the selection item number in the step i), judging whether or not a next offset is in the selection list, and if the counted selection item number is not larger than the selection item number in the step i), adding 1 to the counted selection item number and then reading an offset of selection number in the selection list as an offset of a first selection item selected according to adding 1 to the counted selection item number;

k) judging whether or not the offset of a first selection item is a reproduced offset, if a most significant bit of the offset of a first selection item is "1" in a binary number so that the offset of the first selection item is judged as the reproduced offset, returning to the step i), and if the most significant bit of the offset of a first selection item is "0" in a binary number so that the offset of the first selection item is judged as the non-reproduced offset, logically OR-combining the offset of the first selection item and &8000 and get a reproduced offset a most significant bit of which is "1";

l) logically AND-combining the reproduced offset a most significant bit of which is "1" and &7FFF to return the original offset of the first selection item, and returning to the step e) to repeat the operation after the step e);

m) reading out a play item number which is defined in the play list, if the current list is the play list according to the result of the judgment in the step f), initializing a play item number of the counter to be "1", and setting a counting time of the counter to be 5 seconds;

n) reproducing a play item which is defined in the play list;

o) judging whether or not the reproducing operation for the play item which is defined in the play list is completed, if the reproducing operation for the play item is completed, adding 1 to the counted play item number "1" by the counter in the step m) to increase "2";

p) judging whether or not the increased play item number "2" in the step o) is larger than a total play item number recorded in the play list; and q) according to the result of judgement of whether or not the increased play item number "2" in the step o) is larger than a total play item number recorded in the play list, if the increased play item number "2" is not larger than the total play item number recorded in the play list, returning to the step m), and if the increased play item number "2" is larger than the total play item number recorded in the play list, judging whether or not a next offset is in the play list.

4. The method for sequentially displaying information of an interactive information recording medium as claimed in claim 3, wherein according to the result of the judgment in the step d), the total playback in the sequence information play mode is selected by the user, the play item is reproduced for the total time, and if a partial playback is selected, the play item is reproduced only for the set time by the user.

5. The method for sequentially displaying information of an interactive information recording medium as claimed in claim 3, further comprising the steps of:

i-1) if the reproducing operation for the play item is not completed according to the result of the judgement in the step i), judging whether or not the play item is selected as a total playback mode, if the play item is selected as a total playback mode, returning to the step h), and if the play item is not selected as a total playback mode, judging whether or not the counting time in the step g) is larger than 5 seconds; and i-2) according to the result of the judgement in the step i-1), if the counting time in the step g) is not larger than 5 seconds, returning to the step h), and if the counting time in the step g) is larger than 5 seconds, going to the step i) of judging whether or not the counted selection item number "0" by a counter in the step g) is larger than a selection item number recorded in the selection list.

6. The method for sequentially displaying information of an interactive information recording medium as claimed in claim 3, if the counted selection item number is larger than the selection item number in the step i) according to the result of judgement of whether or not the counted selection item number is larger than the selection item number recorded in the selection list in the step i), after judging whether or not the next offset is in the selection list, said method further comprising the steps of:

j-a) according to the result of judgement of whether or not the next offset is in the selection list, if the next offset is in the selection list, setting the next offset as a current offset to return to the step e), and if the next offset is not in the selection list, judging whether or not the previous offset is in the selection list;

j-b) according to the result of judgement of whether or not the previous offset is in the selection list in the step j-a), if the previous offset is in the selection list, setting the previous offset as a current offset to return to the step e), and if the previous offset is not in the selection list, judging whether or not the return offset is in the selection list; and j-c) according to the result of judgement of whether or not the return offset is in the selection list in the step j-b), if the return offset is in the selection list, setting the return offset as a current offset to return to the step e), and if the return offset is not in the selection list, finishing a total routine.

7. The method for sequentially displaying information of an interactive information recording medium as claimed in claim 3, said method further comprising the steps of:

o-1) if the reproducing operation for the play item is not completed according to the result of the judgement in the step o), judging whether or not the play item is selected as a total playback mode, if the play item is selected as a total playback mode, returning to the step n), and if the play item is not selected as a total playback mode, judging whether or not the counting time in the step m) is larger than 5 seconds; and o-2) according to the result of the judgement in the step o-1), if the counting time in the step m) is not larger than 5 seconds, returning to the step m), and if the counting time in the step m) is larger than 5 seconds, going to the step o) of adding 1 to the counted play item number "1" by the counter in the step m) to increase "2".

* * * * *